US012610160B2

(12) United States Patent
Kim et al.

(10) Patent No.: US 12,610,160 B2
(45) Date of Patent: Apr. 21, 2026

(54) IMAGE SENSOR

(71) Applicant: SAMSUNG ELECTRONICS CO., LTD., Suwon-si (KR)

(72) Inventors: Kyung-Min Kim, Suwon-si (KR); Haneol Seo, Suwon-si (KR); Min-Sun Keel, Suwon-si (KR); Youngtae Jang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 74 days.

(21) Appl. No.: 18/600,114

(22) Filed: Mar. 8, 2024

(65) Prior Publication Data

US 2025/0039571 A1      Jan. 30, 2025

(30) Foreign Application Priority Data

Jul. 24, 2023      (KR) ........................ 10-2023-0096393

(51) Int. Cl.
　　*H04N 25/633*　　(2023.01)
　　*H04N 25/709*　　(2023.01)
(52) U.S. Cl.
　　CPC ......... *H04N 25/633* (2023.01); *H04N 25/709* (2023.01)
(58) Field of Classification Search
　　CPC ........................... H04N 25/633; H04N 25/709
　　USPC ....................................................... 348/308
　　See application file for complete search history.

(56) References Cited

U.S. PATENT DOCUMENTS

| | | | |
|---|---|---|---|
| 8,018,514 B1 | 9/2011 | Baiko et al. | |
| 10,666,883 B2 | 5/2020 | Kim et al. | |
| 11,323,639 B2 | 5/2022 | Cho et al. | |
| 2014/0014818 A1 | 1/2014 | Cho et al. | |
| 2020/0244913 A1 | 7/2020 | Jung et al. | |
| 2022/0014696 A1* | 1/2022 | Spiessens ............ | H04N 25/616 |

FOREIGN PATENT DOCUMENTS

| | | |
|---|---|---|
| JP | 2009-33550 A | 2/2009 |
| JP | 2009-273089 A | 11/2009 |
| JP | 2010-141738 A | 6/2010 |
| JP | 2013-74368 A | 4/2013 |
| KR | 10-2079555 B1 | 2/2020 |

OTHER PUBLICATIONS

Chen et al., "Temperature dependences of threshold voltage and drain-induced barrier lowering in 60 nm gate length MOS transistors," Microelectronics Reliability, 2014, Total 6 pages, http://dx.doi.org/10.1016/j.microrel.2013.12.005.

* cited by examiner

*Primary Examiner* — Joel W Fosselman
(74) *Attorney, Agent, or Firm* — Sughrue Mion, PLLC

(57) ABSTRACT

An image sensor may include: a pixel array including a plurality of first pixels configured to receive light and output a plurality of first pixel signals; a row driver coupled to the plurality of first pixels and configured to apply a preset voltage to the plurality of first pixels; and an image signal processor configured to: obtain first state codes, each related to one of the plurality of first pixels, based on a plurality of second pixel signals received from the plurality of first pixels based on the preset voltage being applied to the plurality of first pixels; and process the plurality of first pixel signals based on the first state codes.

20 Claims, 27 Drawing Sheets

Figure 26:
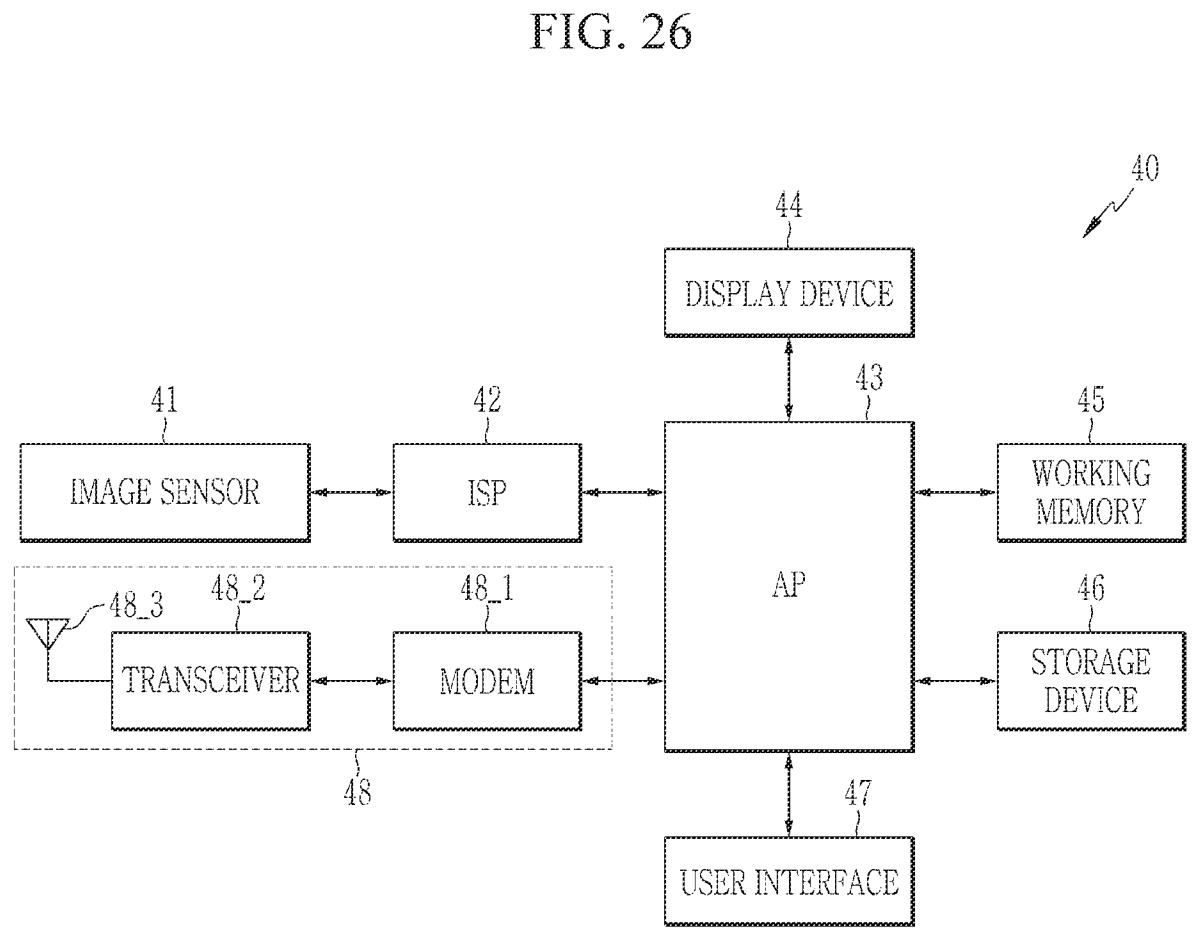

45 WORKING MEMORY

46 STORAGE DEVICE

44 DISPLAY DEVICE

43

AP

47 USER INTERFACE

42 ISP

41 IMAGE SENSOR

48_1 MODEM

48_2 TRANSCEIVER

IMAGE SENSOR

CROSS-REFERENCE TO RELATED APPLICATION

This application claims priority to and the benefit of Korean Patent Application No. 10-2023-0096393 filed in the Korean Intellectual Property Office on Jul. 24, 2023, the disclosure of which is incorporated herein in its entirety by reference.

BACKGROUND

1. Field

The disclosure relates to an image sensor.

2. Description of the Related Art

Image sensors are devices for capturing a two-dimensional or three-dimensional image of an object. Image sensors generate an image of an object, using photoelectric conversion elements that react according to the intensity of light reflected from the object.

As the demand for image sensors with improved performance has increased in various fields, a complementary metal-oxide-semiconductor (CMOS) image sensor using unit pixels made of CMOS has been widely used. On the other hand, as the density of pixels in an image sensor has increased and the size of the image sensor has decreased, the size of pixels has also decreased and the manufacturing processes have become more and more sophisticated. Accordingly, dark current which are undesirable current that are integrated as charge in the photoelectric elements of pixels in an image sensor may occur. An increase in dark current may cause problems such as a decrease in the performance of the elements and a decrease in the charge storage capacity of the elements.

SUMMARY

The disclosure provides apparatuses and methods for correcting dark shading and a dark current level difference between a light-receiving region and a shaded region that are present in image data.

According to an aspect of an example embodiment, an image sensor may include: a pixel array including a plurality of first pixels configured to receive light and output a plurality of first pixel signals; a row driver coupled to the plurality of first pixels and configured to apply a preset voltage to the plurality of first pixels; and an image signal processor configured to: obtain first state codes, each related to one of the plurality of first pixels, based on a plurality of second pixel signals received from the plurality of first pixels based on the preset voltage being applied to the plurality of first pixels; and process the plurality of first pixel signals based on the first state codes.

The plurality of first pixels may include at least one first temperature monitoring pixel. The image sensor may be configured to: measure first dark current codes for the plurality of first pixels based on the plurality of second pixel signals; and generate a first compensation table based on a first temperature state code related to the at least one first temperature monitoring pixel and a first dark current code corresponding to the first temperature state code, the first compensation table including first information about at least one of the first temperature state code, the first dark current code, the first state codes, and the first dark current codes.

The image sensor may be configured to generate first image data based on the plurality of first pixel signals, while operating in an image sensing mode. The image signal processor may be configured to: determine the first dark current codes corresponding to the first state codes based on the first compensation table; and compensate the first image data based on the first dark current codes.

The image signal processor may be configured to compensate the first image data during a vertical blank period based on the pixel array not outputting the plurality of first pixel signals.

The pixel array may further include a plurality of second pixels positioned in a region shielded from the light. The plurality of second pixels may include at least one second temperature monitoring pixel. The image signal processor may be configured to perform: obtaining second state codes, each related to one of the plurality of second pixels, based on third pixel signals received from the plurality of second pixels based on the preset voltage being applied to the plurality of second pixels, measuring second dark current codes related to the plurality of second pixels based on the third pixel signals, and generating a second compensation table containing second information on second state codes and the second dark current codes corresponding to the second state codes, based on at least one of the second state codes of the at least one second temperature monitoring pixel, and the second dark current codes of the at least one second temperature monitoring pixel.

The image sensor may be configured to generate first image data based on the plurality of first pixel signals, while operating in an image sensing mode. The image signal processor may be configured to update the first dark current codes in the first compensation table with the second dark current codes based on there being a difference between the second dark current codes and the first dark current codes in the second compensation table.

The image signal processor may be configured to update the second compensation table during a vertical blank period based on the pixel array not outputting the plurality of first pixel signals.

The image sensor further may include: a temperature monitoring circuit positioned below the pixel array, and configured to measure a temperature value of the at least one first temperature monitoring pixel, and transmit the temperature value to the image signal processor.

The plurality of first pixels may be divided into a plurality of pixel groups, and each of the plurality of pixel groups includes at least one first pixel. The image signal processor may be configured to measure third dark current codes related to representative pixels each of the plurality of pixel groups, based on the plurality of second pixel signals received from the representative pixels, and generate a third compensation table containing third information on third state codes and the third dark current codes corresponding to the third state codes, based on at least one of temperature values of the representative pixels, the third state codes of the representative pixels, and the third dark current codes. The image sensor may be configured to: generate second image data based on the plurality of first pixel signals, while operating in an image sensing mode, obtain the third state codes related to the at least one first pixel of each of the plurality of pixel groups, and determine the third dark current codes related to each of the plurality of first pixels, based on the third compensation table, and compensates the second image data based on the third dark current codes.

The plurality of first pixels include reset transistors coupled between first nodes and voltage lines and configured to supply a reset voltage and are controlled by a reset control signal, gain control transistors coupled between the first nodes and second nodes and configured to be controlled by gain control signals, and drive transistors configured to transfer pixel voltages corresponding to voltages of the second nodes, as the plurality of second pixel signals, to the image signal processor. The row driver includes a reset voltage generation module configured to generate the reset voltage, and a gain control signal generation module configured to generate the gain control signals.

Based on the reset voltage being a first voltage, the reset control signal having a first reset control level, and the gain control signals having a first gain control level, the second nodes may have a first voltage value. Based on the reset voltage being a second voltage lower than the first voltage, the reset control signal having the first reset control level, and the gain control signals having a second gain control level lower than the first gain control level, the second nodes may have a second voltage value. Based on the reset voltage being a third voltage higher than the first voltage, the reset control signal having the first reset control level, the gain control signals having the second gain control level, the second nodes may have a third voltage value. The image signal processor may be configured to obtain the first state codes based on a first pixel voltage corresponding to the first voltage value, and a third pixel voltage corresponding to the third voltage value.

Based on the reset voltage being the third voltage higher than the first voltage, the reset control signal having a second reset control level lower than the first reset control level, and the gain control signals having the second gain control level, the second nodes may have a fourth voltage value. The image signal processor may be configured to obtain the first state codes based on the first pixel voltage corresponding to the first voltage value, and a fourth pixel voltage corresponding to the fourth voltage value.

Based on the reset voltage being a first voltage, the reset control signal having a first reset control level, and the gain control signals having a first gain control level, the second nodes may have a first voltage value. Based on the reset voltage being a second voltage higher than the first voltage, the reset control signal having the first reset control level, and the gain control signals having the first gain control level, the second nodes may have a second voltage value. Based on the reset voltage being the second voltage, the reset control signal having a second reset control level lower than the first reset control level, and the gain control signals having the first gain control level, the second nodes may have a third voltage value. Based on the reset voltage being the first voltage, the reset control signal having the first reset control level, and the gain control signals having the first gain control level, the second nodes may have a fourth voltage value. The image signal processor may be configured to obtain the first state codes based on a third pixel voltage corresponding to the third voltage value, and a fourth pixel voltage corresponding to the fourth voltage value.

Based on the reset voltage being the first voltage, and the reset control signal having the second reset control level, and the gain control signals having the first gain control level, the second nodes may have a fifth voltage value. The image signal processor may be configured to obtain the first state codes based on the third pixel voltage corresponding to the third voltage value, and a fifth pixel voltage corresponding to the fifth voltage value.

The plurality of first pixels may include reset transistors coupled between pixel power supply voltage lines and first nodes and configured to be controlled by a reset control signal, gain control transistors coupled between the first nodes and second nodes and configured to be controlled by gain control signals, and drive transistors configured to transfer pixel voltages corresponding to voltages of the second nodes, as the plurality of second pixel signals, to the image signal processor. The row driver may include a gain control signal generation module configured to generate the gain control signals.

Based on the reset control signal having a first reset control level, and the gain control signals having a first gain control level, the second nodes may have a first voltage value. Based on the reset control signal having a second reset control level lower than the first reset control level, and the gain control signals having a second gain control level lower than the first gain control level, the second nodes may have a second voltage value. Based on the reset control signal having the first reset control level, and the gain control signals having a third gain control level lower than the first gain control level and higher than the second gain control level, the second nodes may have a third voltage value. The image signal processor may be configured to obtain the first state codes based on a first pixel voltage corresponding to the first voltage value, and a third pixel voltage corresponding to the third voltage value.

The plurality of first pixels may include reset transistors coupled between pixel power supply voltage lines and first nodes and configured to be controlled by a reset control signal, transfer transistors coupled between the first nodes and photoelectric elements and configured to be controlled by transfer signals, and drive transistors configured to transfer pixel voltages corresponding to voltages of the first nodes, as the plurality of second pixel signals, to the image signal processor. The row driver may include a reset signal generation module configured to generate the reset control signal, and a transfer signal generation module configured to generate the transfer signals.

Based on the reset control signal having a first reset control level, and the transfer signals having a first transfer control level, the first nodes may have a first voltage value. Based on the reset control signal having a second reset control level lower than the first reset control level, and the transfer signals having a second transfer control level lower than the first transfer control level, the first nodes may have a second voltage value. Based on the reset control signal having a third reset control level lower than the first reset control level and higher than the second reset control level, and the transfer signals having the second transfer control level, the first nodes may have a third voltage value. The image signal processor may be configured to obtain the first state codes based on a first pixel voltage corresponding to the first voltage value, and a third pixel voltage corresponding to the third voltage value.

According to an aspect of an example embodiment, an operating method of an image sensor, may include: performing a first state code measurement operation by receiving light and applying a preset voltage to a plurality of first pixels to output a plurality of first pixel signals; performing a first state code obtaining operation by obtaining first state codes, each related to one of the plurality of first pixels, based on a plurality of second pixel signals received from the plurality of first pixels based on the preset voltage being applied to the plurality of first pixels; performing a dark-current code measurement operation on the plurality of first pixels based on the plurality of second pixel signals; and generating a first compensation table containing first information on the first state codes and first dark current codes corresponding to the first state codes, based on the first state codes and the first dark current codes.

The operating method of the image sensor further may include: performing the first state code obtaining operation while generating first image data based on the plurality of first pixel signals, and determining the first dark current codes based on the first compensation table, and compensating the first image data based on the first dark current codes.

An image sensor according to some embodiments can compensate for dark shading and dark current level differences.

BRIEF DESCRIPTION OF DRAWINGS

The above and other aspects, features, and advantages of certain embodiments of the present disclosure will be more apparent from the following description taken in conjunction with the accompanying drawings, in which:

FIG. 15 is a view illustrating the circuit of the image sensor during the operation of the image sensor according to FIG. 13.

FIG. 26 is a block diagram illustrating an electronic device according to an embodiment.

FIG. 27 is a block diagram illustrating a vehicle according to an embodiment.

DETAILED DESCRIPTION

Figure 1:
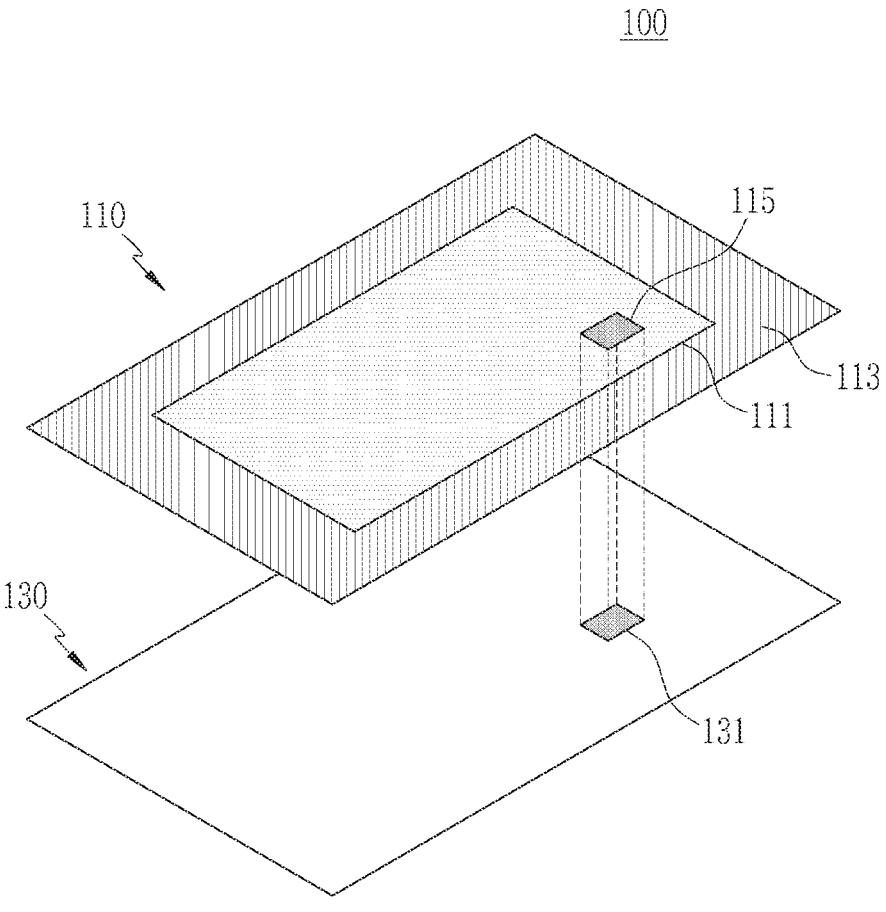
FIG. 1 is a view illustrating a conceptual layout of an image sensor according to an embodiment.

The embodiments described herein are non-limiting example embodiments, and thus, the disclosure is not limited thereto and may be realized in various other forms. As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

In the following detailed description, only examples of the disclosure have been shown and described, simply by way of illustration. As those skilled in the art would realize, the described embodiments may be modified in various different ways, all without departing from the spirit or scope of the disclosure.

Accordingly, the drawings and description are to be regarded as illustrative in nature and not restrictive. Like reference numerals designate like elements throughout the specification. In the flow charts described with reference to the drawings, the order of operations may be changed, and several operations may be combined, and an operation may be divided, and some operations may not be performed.

Further, expressions written in the singular forms can be comprehended as the singular forms or plural forms unless clear expressions such as "a", "an", or "single" are used. Terms including an ordinal number, such as first and second, are used for describing various constituent elements, but the constituent elements are not limited by the terms. The terms are used only to discriminate one constituent element from other constituent elements.

FIG. 1 is a view illustrating a conceptual layout of an image sensor according to an embodiment.

An image sensor 100 is a device for converting light received from the outside into electrical signals. As shown in FIG. 1, the image sensor 100 may include a first chip 110 and a second chip 130 stacked. In FIG. 1, it is shown that the first chip 110 and the second chip 130 are stacked in the vertical direction; however, the first chip 110 and the second chip 130 may be formed as one chip.

In the first chip 110, a plurality of pixels may be arranged in a two-dimensional array structure. The first chip 110 may include a light-receiving region 111 and a shaded region 113. The light-receiving region 111 may be a region where images to be displayed on a screen are acquired. The shaded region 113 may be a region which is shielded from light. In FIG. 1, it is shown that the shaded region 113 is formed along the edge of the light-receiving region 111; however, the shaded region is not limited thereto. Further, the shaded region 113 may be deformed in various shapes and sizes. In the light-receiving region 111 and the shaded region 113, a plurality of unit pixel regions may be formed in a two-dimensional array (for example, in the form of a matrix). The plurality of unit pixel regions may generate pixel signals.

In the light-receiving region 111, a plurality of pixels (for example, active pixels) may be arranged. The pixels in the light-receiving region 111 may receive light to generate active signals. In the shaded region 113, a plurality of pixels (for example, optical black pixels) may be arranged. Since the pixels in the shaded region 113 perform photoelectric conversion in a shaded environment, the pixels in the shaded region 113 may generate optical black signals corresponding to charge which is generated by another reason other than light, such as dark current.

The second chip 130 may be electrically coupled to the first chip 110. The second chip 130 may include circuits and so on for processing pixel signals generated by the first chip 110.

Also, the second chip 130 may include a temperature monitoring circuit (TMC) 131. The TMC 131 may measure the temperature of the image sensor 100. In the drawing, it is shown that the TMC 131 is disposed in a region of the second chip 130 corresponding to the light-receiving region 111 of the first chip 110; however, the TMC 131 may be disposed in a region of the second chip 130 corresponding to the shaded region 113 of the first chip 110. Alternatively or additionally, TMCs 131 may be arranged in a plurality of regions.

A temperature monitoring pixel (TMP) 115 may be disposed so as to correspond to the position of the TMC 131 in the second chip 130

The TMP 115 may be positioned in the first chip 110. When the first chip 110 and the second chip 130 are stacked in the vertical direction, the TMC 131 may measure the temperature of the TMP 115.

As temperature rises, the magnitude of dark current may increase. In order to compensate for the effect of dark current, the pixel data value of the optical black region which is completely shielded from light (i.e., black pixel value) may be used. When such dark-current compensation is performed, the difference between the dark-current level of active signals and the dark-current level of optical black signals may cause an offset of the pedestal level. The offset of the pedestal level may lead to dark shading. The difference between the dark-current level of optical black signals and the dark-current level of active signals may result from an offset caused by a change in the manufacturing processes or a difference in structure. The offset of the pedestal level may vary based on the temperature.

When the pedestal level has an offset other than "0", in a low-illumination region of the image sensor 100, a color distortion phenomenon, such as distortion of reddish colors, bluish colors, greenish colors, etc., may occur. Further, when the image sensor 100 synthesizes low-illumination and high-illumination images through a high dynamic range (HDR) method in a state where the pedestal level is not "0", it may cause problems such as color reproduction errors, a degradation in the signal-to-noise ratio (SNR), etc.

There is a grid offset surface (GOS) manner for correcting dark shading, which stores shading in each region under a plurality of predetermined temperature conditions, and predicts a shading pattern for each pixel position according to temperature, on the basis of the stored information, and uses the predicted shading patterns. In the GOS manner, on the basis of a temperature value acquired by the TMC 131, shading patterns required for the corresponding temperature may be predicted and be used for correction. However, the shading patterns according to the temperature, collected for correction, may not meet every operation scenario of the image sensor. When the step of storing the shading patterns of each region according to the plurality of temperature conditions is a step of an EDS (electric die sorting) process or package process for determining whether there is any defect in image sensors, measured shading patterns may be different from shading patterns of the image sensor in a step in which the image sensor is actually used. Further, the manner in which shading patterns of each region according to the plurality of temperature conditions are stored and are used for correction has a problem that it cannot take the temperature distributions of the image sensor and dark-current distributions according to various operating environments into account. Furthermore, there is a problem that it does not reflect changes in the characteristics of elements in the image sensor over time.

There is an optical black recovery (OBR) manner for correcting the difference between the dark-current level of active signals and the dark-current level of optical black signals, which corrects the offset difference on the basis of the correlation between the offset of the pedestal level of active signals and the offset of the pedestal level of optical black signals corresponding to each temperature condition. The OBR may be performed in an auto dark level compensation (ADLC) step. However, similar to the correction function of the GOS, the OBR manner also has a problem in that the data collecting step required for OBR correction and the collected data may not represent every operating environment of the sensor.

Furthermore, since image sensors are generally exposed to light, image signals of light-receiving regions may include signals caused by dark current and signals caused by light together. Accordingly, it may be impossible to measure the dark-current levels of pixels and the internal temperatures of pixels in the light-receiving regions in real time.

However, the image sensor 100 according to an embodiment can correct dark shading and the difference between the dark-current level of active signals and the dark-current level of optical black signals in light of the dark-current offset level difference between the light-receiving region 111 and the shaded region 113 in real time.

Figure 2:
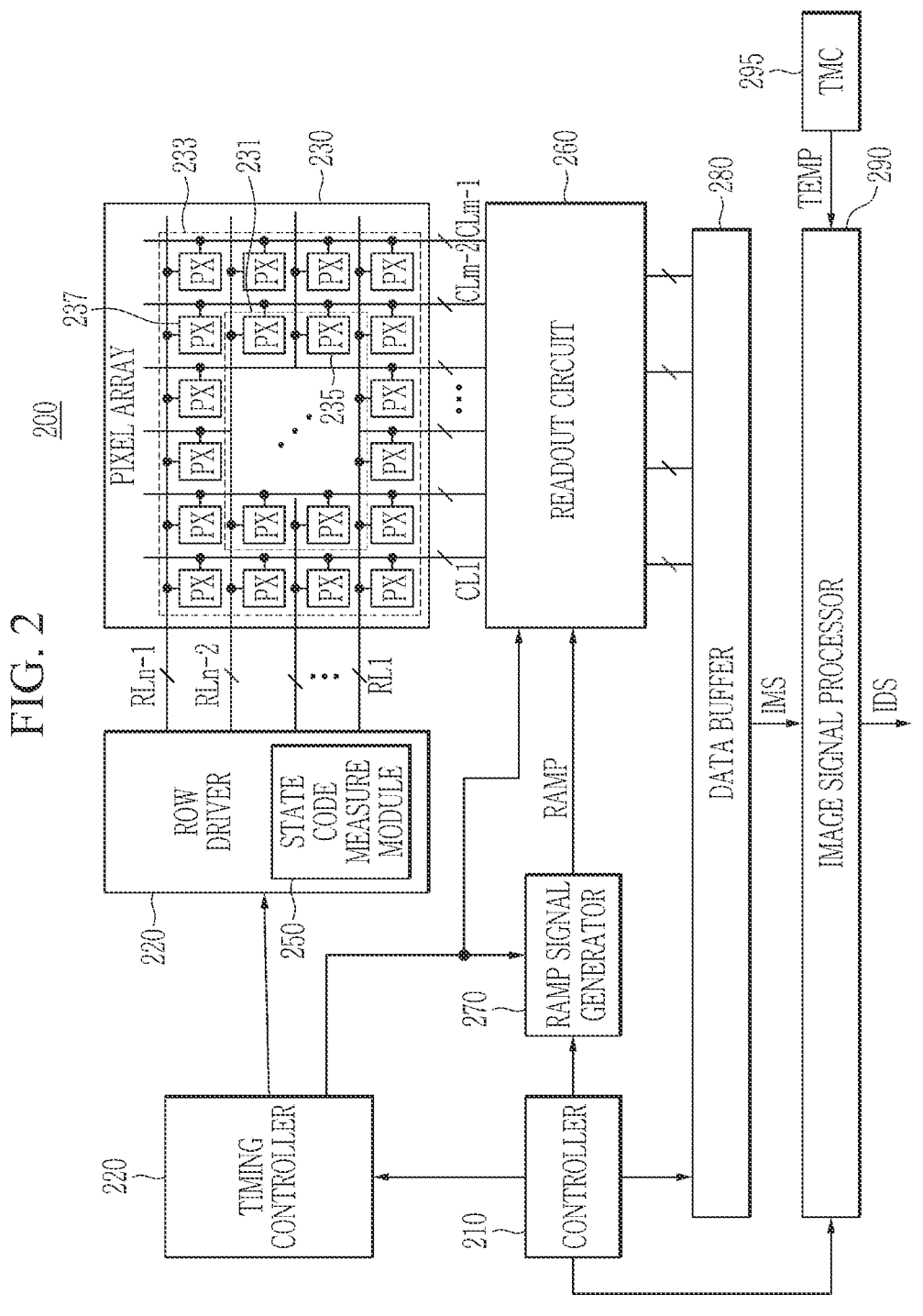
FIG. 2 is a block diagram of an image sensor according to an embodiment.

FIG. 2 is a block diagram of an image sensor according to an embodiment.

As shown in FIG. 2, an image sensor 200 according to an embodiment may include a controller 210, a timing controller 220, a row driver 240, a pixel array 230, a readout circuit 260, a ramp signal generator 270, a data buffer 280, an image signal processor 290, and a TMC 295. In some embodiments, the image signal processor 290 may be positioned outside the image sensor 200. In some embodiments, the pixel array 230 may be implemented in a first chip (reference symbol "110" in FIG. 1), and the controller 210, the timing controller 220, the row driver 240, the readout circuit 260, the ramp signal generator 270, the data buffer 280, the image signal processor 290, and the TMC 295 may be implemented in a second chip (reference symbol "130" in FIG. 1).

The image sensor 200 may generate an image signal IMS by converting light received from the outside into an electrical signal. The image signal IMS may be provided to the image signal processor 290.

The image sensor 200 may be mounted in an electronic device having an image or light sensing function. For example, the image sensor 200 may be mounted in electronic devices such as cameras, smart phones, wearable devices, IoT (Internet of Things) devices, home appliances, tablet PCs (personal computers), personal digital assistants (PDAs), portable multimedia players (PMPs) navigation devices, drones, advanced drivers assistance systems (ADASs), etc. Also, the image sensor 200 may be mounted in electronic devices which are incorporated as components in vehicles, furniture, manufacturing equipment, doors, various measuring devices, etc.

The controller 210 may control the individual constituent elements 220, 230, 240, 250, 260, 270, 280, 290, and 295 included in the image sensor 200. The controller 210 may control the operation timings of the individual constituent elements 220, 230, 240, 250, 260, 270, 280, 290, and 295, using control signals.

In some embodiments, the controller 210 may control the individual constituent elements 220, 230, 240, 250, 260, 270, 280, 290, and 295 included in the image sensor 200, such that the image sensor 200 operates in an image sensing mode or a state measurement mode. The image sensing mode may be a mode in which the image sensor 200 converts light received from the outside into electrical signals. The state measurement mode may be a mode for measuring the state of an element in a pixel PX in order to correct a pedestal error in the image sensor 200.

While the image sensor 200 is operating in the image sensing mode, the controller 210 may control the ramp signal generator 270 such that a reference signal RAMP which is generated by the ramp signal generator 270 is adjusted. While the image sensor 200 is operating in the image sensing mode, the controller 210 may control the timing controller 220 to adjust the floating diffusion (FD) capacitance of a pixel circuit in the pixel array 230 through the row driver 240.

While the image sensor 200 is operating in the state measurement mode, the controller 210 may control the row driver 240 and the image signal processor 290 to measure the state code of a pixel PX in the pixel array 230. The state code may represent a characteristic of an element in the pixel PX. For example, the state code of the pixel PX may be the threshold voltage of a transistor in the pixel PX. In some embodiments, the controller 210 may measure the dark current code of a pixel PX in the pixel array 230 by controlling the row driver 240. In some embodiments, the controller 210 may control the timing when the data buffer 280 outputs data stored in the data buffer 280 to the image signal processor 290.

In some embodiments, the controller 210 may receive a mode signal indicating an imaging mode, from an application processor, and generally control the image sensor 200 on the basis of the received mode signal. For example, the application processor may determine an imaging mode of the image sensor 200 according to various scenarios such as the illumination in the imaging environment, the user's resolution setting, a sensed or learned state, etc., and provide the determined result as a mode signal to the controller 210. The controller 210 may perform control such that the plurality of pixels in the pixel array 230 outputs pixel signals according to the imaging mode, and the pixel array 230 may output the pixel signals of the plurality of individual pixels or the pixel signals of some of the plurality of pixels, and the readout circuit 260 may sample and process the pixel signals received from the pixel array 230.

The timing controller 220 may generate a signal which is a reference for the operation timings of the components of the image sensor 200. The timing controller 220 may control the timings of the row driver 240, the readout circuit 260, and the ramp signal generator 270. The timing controller 220 may provide a control signal to control the timings of the row driver 240, the readout circuit 260, and the ramp signal generator 270.

The pixel array 230 may include the plurality of pixels PX, and a plurality of row lines RL and a plurality of column lines CL that are coupled to the plurality of pixels PX, respectively. In some embodiments, each pixel PX may include at least one photoelectric element (also referred to as optical sensing device). The photoelectric elements may detect incident light, and convert the incident light into electrical signals based on the amount of light, i.e., a plurality of analog pixel signals. The levels of analog pixel signals which are output from the photoelectric elements may increase as the amounts of charge which are output from the photoelectric elements increase. In other words, the levels of analog pixel signals which are output from the photoelectric elements may increase as the amount of light entering the pixel array 230 increases. Meanwhile, as shown in FIG. 1, the pixel array 230 may include pixels arranged in the light-receiving region 111 and pixels arranged in the shaded region 113. Further, some of the plurality of pixels PX may be temperature monitoring pixels. In FIG. 2, a first TMP 235 may be disposed in a light-receiving region 231, and a second TMP 237 may be disposed in a shaded region 233. In FIG. 2, it is shown that the pixel array 230 includes one TMP in the light-receiving region 231 and includes one TMP in the shaded region 233; however, the disclosure is not limited thereto, and the pixel array 230 may include a plurality of TMPs in the light-receiving region 231 and include a plurality of TMPs in the shaded region 233. In some embodiments, below the first TMP 235 and the second TMP 237, TMCs 295 may be disposed.

The plurality of row lines RL (RL1 to RLn−1) may extend in a first direction, and be coupled to pixels PX arranged along the first direction. For example, the plurality of row lines RL may transmit control signals output from the row driver 240 to elements included in the pixels PX, for example, transistors. Signal lines other than the row lines RL may be arranged in the first direction. The plurality of column lines CL (CL1 to CLm−1) may extend in a second direction intersecting the first direction, and be coupled to pixels PX arranged along the second direction. The column lines CL may transmit pixel signals output from the pixels PX to the readout circuit 260.

In some embodiments, one pixel PX may include a plurality of sub-pixel groups. The sub-pixel groups may be arranged in the form of an M-by-N matrix (wherein M and N are integers greater than 2). The form of an M-by-N matrix may be a form having M number of columns arranged in the arrangement direction of the column lines CL and N number of rows arranged in the arrangement direction of the row lines RL.

The row driver 240 may generate a control signal for driving the pixel array 230, in response to a control signal from the timing controller 220, and provide the control signal to the plurality of pixels PX of the pixel array 230 through the plurality of row lines RL. In some embodiments, the row driver 240 may control the pixels PX in row line units, such that the pixels detect incident light. Each row line unit may include at least one row line RL.

In some embodiments, the row driver 240 may include a state code measure module 250. The state code measure module 250 may be coupled to a plurality of pixels PX through at least one row line RL. The state code measure module 250 may perform a preset state code measurement operation on the basis of the type of the coupled pixels PX. The state code measure module 250 may perform a state code measurement operation when the image sensor 200 operates in the state measurement mode. The state code measure module 250 may apply a preset voltage to the pixel array 230 for the state code measurement operation. The pixel array 230 may generate state signals as pixel signals, according to the voltage applied from the state code measure module 250. The column lines CL may carry the state signals output from the pixels PX to the readout circuit 260.

The state code measure module 250 may perform a dark-current measurement operation. The state code measure module 250 may apply a preset voltage to the pixel array 230 in order to measure the dark current from the plurality of optical black pixels positioned in the shaded region 233 and the plurality of active pixels positioned in the light-receiving region 231. As described above, the dark current may be current which is caused by charge generated by a cause other than light. Accordingly, when the image sensor 200 is operating in the image sensing mode or the state measurement mode, during a dark-current measurement operation on the active pixels in the light-receiving region 231, the state code measure module 250 may not distinguish dark current from current generated by charge generated by light. In contrast, when the image sensor 200 is operating in the image sensing mode or the state measurement mode, since the optical black pixels in the shaded region 233 do not generate current based on charge generated by light. Accordingly, the state code measure module 250 may perform a dark-current measurement operation on the optical black pixels even when the image sensor 200 is operating in the image sensing mode.

In some embodiments, the state code measure module 250 may apply a preset voltage to the pixel array 230 in order to measure dark current from the plurality of optical black pixels and the plurality of active pixels during an EDS process. In some embodiments, the state code measure module 250 may measure dark current from the plurality of optical black pixels while the image sensor 200 is operating in the state measurement mode. The pixel array 230 may generate dark-current signals as pixel signals, according to the voltage applied from the state code measure module 250. The column lines CL may carry the dark-current signals output from the pixels PX to the readout circuit 260.

The readout circuit 260 may convert pixel signals (or electrical signals) received from pixels PX coupled to a selected row line RL among the plurality of pixels PX, into pixel values indicating the amounts of light, in response to a control signal from the timing controller 220. The readout circuit 260 may convert pixel signals output through corresponding column lines CL into pixel values. For example, the readout circuit 260 may convert pixel signals into pixel values by comparing the pixel signals with ramp signals. Pixel values may be image data items, each of which has a plurality of bits. Specifically, the readout circuit 260 may include a selector, a plurality of comparators, a plurality of counter circuits, etc.

In some embodiments, the readout circuit 260 may convert state signals (or electrical signals) received from pixels PX coupled to a selected row line RL among the plurality of pixels PX, into state codes, in response to a control signal from the timing controller 220. Each state code may be state data having a plurality of bits. In some embodiments, the readout circuit 260 may convert dark-current signals (or electrical signals) into dark current codes. Each dark current code may be dark-current data having a plurality of bits.

The ramp signal generator 270 may generate a reference signal RAMP and transmit it to the readout circuit 260. The ramp signal generator 270 may include current sources, resistors, and capacitors. The ramp signal generator 270 may adjust ramp voltage which is voltage to be applied to a ramp resistor by adjusting the current magnitude of a variable current source or the resistance value of a variable resistor. In this way, the ramp signal generator may generate a plurality of ramp signals which falls or rise at slopes determined depending on the current magnitudes of variable current sources or the resistance values of variable resistors.

The data buffer 280 may store the pixel values of the plurality of pixels PX coupled to the selected column line CL, received from the readout circuit 260. Further, the data buffer 280 may store the state codes of the plurality of pixels PX coupled to the selected column line CL, received from the readout circuit 260. The data buffer 280 may output the pixel values, the state codes, or the dark current codes stored, to the image signal processor 290, in response to an enable signal from the controller 210. For example, the data buffer 280 may receive the state codes from the readout circuit 260 as the row driver 240 performs the state code measurement operation, and transmit the received state code values to the image signal processor 290. In some embodiments, the data buffer 280 may store a plurality of state codes received from the readout circuit 260 while the row driver 240 is performing the state code measurement operation, and transmit the plurality of stored state codes to the image signal processor 290 after the row driver 240 completes the state code measurement operation.

The TMC 295 may measure the temperature of the image sensor 200, thereby generating a temperature value TEMP. Specifically, the TMC 295 may measure the temperature at the position where the TMC 295 is disposed. The TMC 295 may transmit the generated temperature value TEMP corresponding to the temperature, to the image signal processor 290.

The image signal processor 290 may perform image signal processing on image signals received from the data buffer 280. For example, the image signal processor 290 may receive a plurality of image signals IMS from the data buffer 280, and synthesize the received image signals IMS to generate one image. Here, image signals IMS may be based on pixel signals which are output from the pixels PX positioned in the light-receiving region 231 in the image sensor 200.

The image signal processor 290 may compensate the plurality of received image signals IMS for dark current, thereby generating image data IDS.

In some embodiments, the image signal processor 290 may perform a state code calculation operation on the plurality of state codes received from the data buffer 280. The image signal processor 290 may acquire the state codes related to the individual pixels PX in the pixel array 230. The state codes indicate the threshold voltages of the transistors in the individual pixels PX in the pixel array 230. How the image signal processor 290 performs the state code calculation operation will be described below with reference to FIG. 12 to FIG. 25. The image signal processor 290 may receive the temperature values TEMP of the TMPs 235 and 237 positioned on the TMCs 295, from the TMCs 295, while the state code measure module 250 performs the state code measurement operation.

In some embodiments, the image signal processor 290 may receive dark current codes. The image signal processor 290 may receive the temperature values TEMP of the TMPs 235 and 237 positioned on the TMCs 295, from the TMCs 295, while the state code measure module 250 performs the dark-current measurement operation.

The image signal processor 290 may generate a compensation table based on the temperature values TEMP, the state codes, and the dark current codes. In some embodiments, the image signal processor 290 may generate a compensation table during an EDS process. For example, during an EDS process, when the image sensor 200 has a preset temperature value TEMP, the image signal processor 290 may calculate a state code according to the position of each pixel PX, and may receive dark current codes. The compensation table may include the state codes and dark current codes according to the temperature value TEMP, in association with the plurality of individual pixels PX in the pixel array 230. Accordingly, the image signal processor 290 may calculate the correlation between the state codes of the pixels PX and the dark current codes. For example, the compensation table may include information on the dark current codes corresponding to the state codes of the pixels PX. On the other hand, the correlation between the state codes of the pixels in the light-receiving region 231 and the dark current codes may be different from the correlation between the state codes of the pixels in the shaded region 233 and the dark current codes.

The image signal processor 290 may include a register for storing the compensation table. The register may be disposed outside the image signal processor 290.

The image signal processor 290 may compensate for dark current present in image signals IMS based on the compensation table stored in advance. Specifically, the image signal processor 290 may determine dark current codes corresponding to state codes calculated with respect to the pixels in the light-receiving region 231. Accordingly, the image signal processor 290 may apply the dark current codes of the individual pixels PX to the received image signals. For example, the image signal processor 290 may generate image data IDS containing values obtained by subtracting the dark current codes of the individual pixels PX from the image signals IMS.

In some embodiments, the image signal processor 290 may update the compensation table stored in advance. For example, the image signal processor 290 may update the compensation table when the state code of any pixel at an arbitrary temperature value TEMP and the dark current code at the above-mentioned temperature value TEMP are different in the compensation table. For example, the image signal processor 290 may update the compensation table in a vertical blank period of the image sensor 200. In some embodiments, since the characteristics of elements in the pixels PX may vary over time, in order for accurate correction of image signals, the image signal processor 290 may update the compensation table at predetermined intervals. For example, the image signal processor 290 may update the compensation table in every vertical blank period of the image sensor 200, or may update the compensation table once every three vertical blank periods. However, the disclosure is not limited thereto, and the image signal processor 290 may update the compensation table at an arbitrary suitable interval. In some embodiments, when the image sensor 200 is operating in the state measurement mode, the image signal processor 290 may re-measure the state codes and the dark current codes related to the pixels PX at the corresponding temperature value TEMP, and update the compensation table based on them.

In some embodiments, the image signal processor 290 may update the compensation table for the light-receiving region 231 based on the compensation table for the pixels in the shaded region 233. For example, the image signal processor 290 may update the compensation table for the pixels in the light-receiving region 231 based on the compensation table for the pixels in the shaded region 233 while the image sensor 200 is operating in an image sensing mode.

In some embodiments, the image signal processor 290 may update the compensation table for a pixel in the light-receiving region 231 if there is a difference between the dark current code for the pixel in the light-receiving region 231 and the dark current code for the pixel in the shaded region 233. For example, the image signal processor 290 may update the compensation table for the pixels in the light-receiving region 231 such that the average value of the dark-current codes for the plurality of pixels in the light-receiving region 231 is equal to the average value of the dark-current codes for the plurality of pixels in the shaded region 233. Specifically, the image signal processor 290 may modify the dark-current codes for the plurality of pixels in the light-receiving region 231 by multiplying a certain percentage to the plurality of pixels in the light-receiving region 231 so that the average value of the dark-current codes for the plurality of pixels in the light-receiving region 231 is equal to the average value of the dark-current codes for the plurality of pixels in the shaded region 233.

Figure 3:
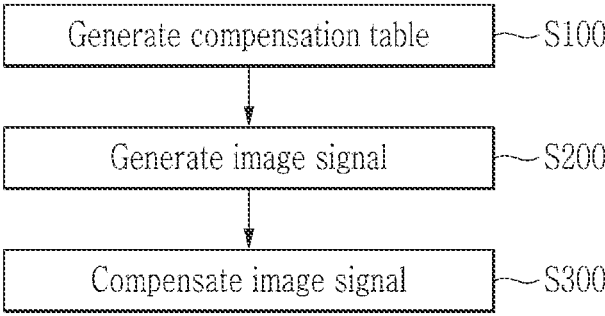
FIG. 3 is a flow chart illustrating how the image sensor according to an embodiment generates image data.

FIG. 3 is a flow chart illustrating how the image sensor according to an embodiment generates image data.

First, the image sensor 200 generates a compensation table (S100).

In some embodiments, the step in which the image sensor 200 generates a compensation table may be performed in an EDS process step. Hereinafter, STEP S100 will be described while referring to FIG. 4 together.

Figure 4:
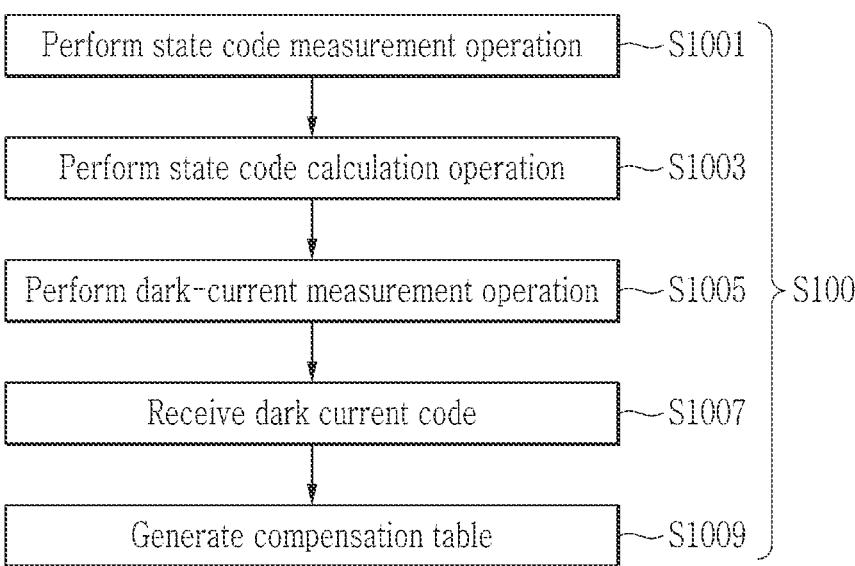
FIG. 4 is a flow chart illustrating how the image sensor according to an embodiment generates a compensation table.

FIG. 4 is a flow chart illustrating how the image sensor according to an embodiment generates a compensation table.

Referring to FIG. 4 together, the state code measure module 250 performs a state code measurement operation (S1001).

The state code measure module 250 may sequentially apply a preset voltage according to the types of pixels PX. For example, the state code measure module 250 may apply a preset voltage to the TMP 235. In this case, the TMP 235 may be an active pixel positioned in the light-receiving region 231. In some embodiments, the state code measure module 250 may apply a first voltage set to individual transistors in the TMP 235, and apply a second voltage set to the individual transistors in the TMP 235 after a predetermined time, and apply a third voltage set to the individual transistors in the TMP 235 after a predetermined time. While the state code measure module 250 is performing the state code measurement operation, the TMC 295 may measure the temperature of the TMP 235 to generate a temperature value TEMP. For example, the TMP 235 may have a first temperature value.

Meanwhile, the state code measure module 250 may perform a state code measurement operation on the TMP 237 positioned in the shaded region 233.

The image signal processor 290 performs a state code calculation operation (S1003).

The image signal processor 290 may calculate a state code on the basis of code values acquired in STEP S100. For example, the image signal processor 290 may calculate a state code related to the TMP 235, on the basis of a first state signal output from the pixel array 230 when the state code measure module 250 applied the first voltage set to the TMP 235, a second state signal output from the pixel array 230 when the state code measure module 250 applied the second voltage set to the TMP 235, and a third state signal output from the pixel array 230 when the state code measure module 250 applied the third voltage set to the TMP 235. For example, the TMP 235 may have a first state code when having the first temperature value.

Subsequently, the state code measure module 250 performs a dark-current measurement operation (S1005).

The state code measure module 250 may apply a preset voltage to the pixels PX. For example, the state code measure module 250 may apply a voltage of 0 V to the TMP 235. While the state code measure module 250 is performing the dark-current measurement operation, the TMC 295 may measure the temperature of the TMP 235 to generate a temperature value TEMP.

The image signal processor 290 receives a dark current code (S1007).

In the EDS process step, since no light has yet been received by the image sensor 200, the state code measure module 250 may perform the dark-current measurement operation, whereby the pixel array 230 may output a signal based on dark current. Accordingly, the image signal processor 290 may acquire a dark current code related to the first temperature of the TMP 235. For example, the TMP 235 may have a first dark current code when having the first temperature value.

The image signal processor 290 generates a compensation table (S1009).

The compensation table may include a state code and a dark current code according to the temperature value TEMP, in association with each of the plurality of pixels PX in the pixel array 230. For example, the compensation table may include a first state code and a first dark current code when the TMP 235 has the first temperature value.

When the image sensor 200 has various temperature conditions, the image signal processor 290 may generate a compensation table related to one TMP 235 by performing STEP S1001 to STEP S1009 a plurality of times. For example, when the TMP 235 has a second temperature value different from the first temperature value, the compensation table may include a second state code and a second dark current code.

The image signal processor 290 may generate a compensation table related to each of the plurality of pixels PX, and calculate formulas related to the relationship between the temperature value TEMP of the TMC 295 and a state code and the relationship between the temperature value TEMP of the TMC 295 and a dark current code. Based on this, the image signal processor 290 may derive the relationship between the state code and the dark current code.

On the other hand, the image signal processor 290 may generate a compensation table according to various temperature conditions, with reference to each of the plurality of pixels PX. Even though the plurality of pixels PX is positioned in one image sensor 200, the pixels PX may have different temperatures depending on the structure of the image sensor 200. Accordingly, the image signal processor 290 may apply different compensation values according to the positions of the pixels PX in the pixel array 230.

The image signal processor 290 may store the generated compensation table.

Referring to FIG. 3 again, the image sensor 200 generates an image signal (S200).

The image sensor 200 may convert light received from the outside into an electrical signal, thereby generating an image signal IMS. In this case, the image signal IMS may be based on pixel signals which are output from pixels positioned in the light-receiving region 231 in the image sensor 200.

The image sensor 200 compensates the image signal (S300). Hereinafter, STEP S300 will be described while referring to FIG. 5 together.

Figure 5:
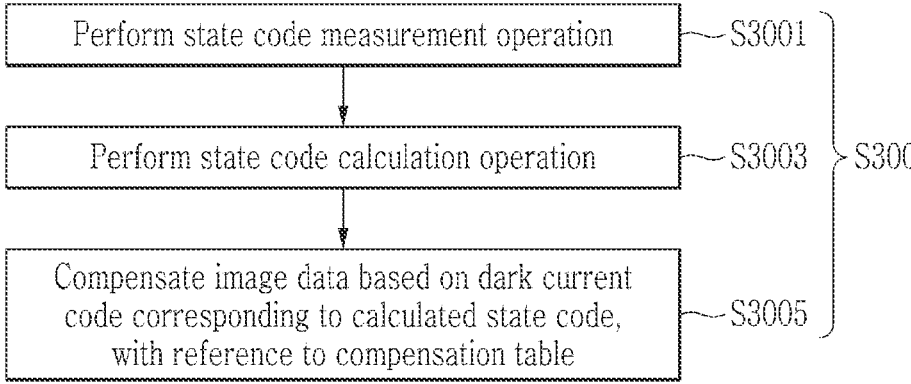
FIG. 5 is a flow chart illustrating how the image sensor according to an embodiment compensates an image signal.

FIG. 5 is a flow chart illustrating how the image sensor according to an embodiment compensates an image signal.

Referring to FIG. 5 together, the state code measure module 250 performs a state code measurement operation (S3001).

In some embodiments, the state code measure module 250 may perform a state code measurement operation on the active pixels. For example, the state code measure module 250 may perform a state code measurement operation on the TMP 235.

The image signal processor 290 performs a state code calculation operation (S3003).

For example, by calculation, the image signal processor 290 may determine that the TMP 235 has the first state code.

The image signal processor 290 compensates image data on the basis of a dark current code corresponding to the state code calculated on the basis of the compensation table (S3005).

Specifically, the image signal processor 290 may read a dark current code corresponding to a state code calculated in STEP S100 from the compensation table stored in the image signal processor 290. In some embodiments, the image sensor 200 may compensate the image signal on the basis of the compensation table generated in STEP S100. For example, when the TMP 235 has the first state code, the image signal processor 290 may read, from the compensation table, that the TMP 235 has the first dark current code. Further, when the TMP 235 has the first state code, the image signal processor 290 may read, from the compensation table, that the TMP 235 has the first temperature value. The image signal processor 290 may generate compensated image data reflecting the first dark current code, from the image data output from the TMP 235 and contained in the image signal. For example, the image signal processor 290 may generate compensated image data by subtracting or adding the first dark current code from or to the image data.

On the other hand, in FIG. 3, it is shown that STEP S300 is performed after STEP S200; however, the disclosure is not limited thereto, and STEP S300 may be performed first and then STEP S200 may be performed. In the case where STEP S300 is performed first, the image signal processor 290 may acquire the compensation table in advance, and apply a compensation value to the sensed image data on the basis of the acquired compensation table.

Figure 6:
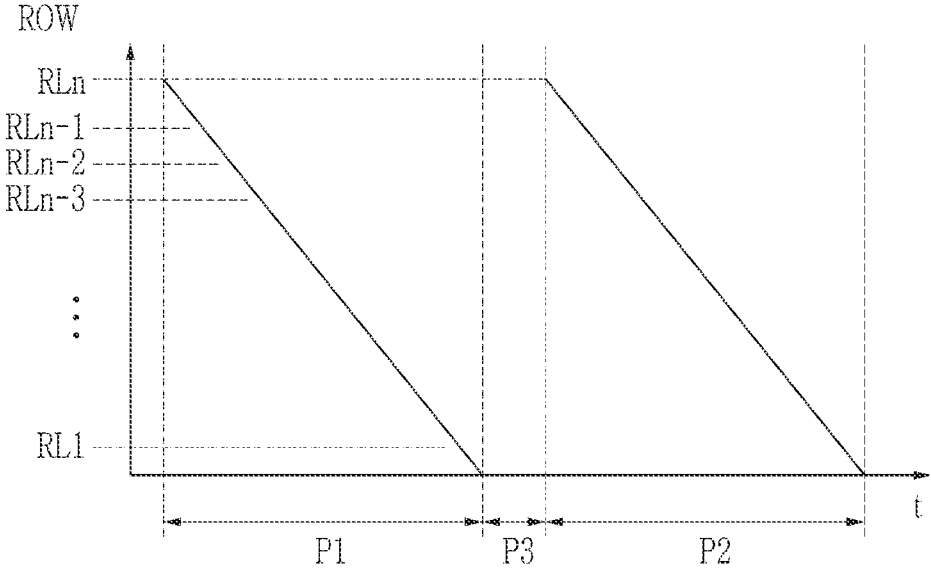
FIG. 6 is a view illustrating rows depending on the operation of the image sensor according to an embodiment.

FIG. 6 is also referred to in relation to when the image sensor 200 performs the method of compensating an image signal IMS.

FIG. 6 is a view illustrating rows depending on the operation of the image sensor according to an embodiment.

Specifically, FIG. 6 is a graph illustrating row addresses which the image sensor 200 reads over time. Specifically, FIG. 6 shows a plurality of scan periods for driving the plurality of pixels PX in row line units.

As shown in FIG. 2, the pixel array 230 may include the plurality of pixels PX. In some embodiments, the time required to drive a row line selected from the plurality of row lines RL and read image signals from the pixels PX coupled to the selected row line may be defined as one horizontal period. The image sensor may operate in rolling shutter way to sequentially drive the plurality of row lines RL.

A first period P1 and a second period P2 may be periods during which the image sensor 200 performs image sensing on the pixel array 230.

On the other hand, frame periods of the image sensor 200 may be defined as times required to read reset voltages and pixel voltages from all the pixels included in the pixel array 230. In some embodiments, one frame period may be equal to the product of the number of row lines RL and the horizontal period, or may be greater than the product of the number of row lines RL and the horizontal period. As the frame period of the image sensor shortens, the image sensor may generate a larger number of image data items for the same period of time.

In one frame period, the image sensor 200 may generate one image data item. For example, the image sensor 200 may generate one image data item in the first period P1, and generate one image data item in the second period P2. The operation of the image sensor 200 in the second period P2 may be similar to the operation of the image sensor 200 in the first period P1.

On the other hand, between a period when the image sensor 200 generates one image data item and a period when the image sensor generates the next image data item, a third period P3 may be present. The third period P3 may be a vertical blank period. The vertical blank period may be a period when the image sensor 200 does not generate image data. The third period P3 may be a period when photoelectric charge is accumulated in the photoelectric elements of the pixels PX. In the third period P3, the image sensor 200 may perform operations required to generate image data.

In some embodiments, the image sensor 200 may perform operations required to compensate the image data item generated in the first period P1, in the third period P3. For example, the image sensor 200 may perform a state code measurement operation and a state code calculation operation during the third period P3. The image sensor 200 may determine dark current codes on the basis of the state codes related to the individual pixels PX determined in the third period P3, and compensate the image data item generated in the first period P1, on the basis of the dark current codes.

In some embodiments, the image sensor 200 may perform operations required for the second period P2 to generate image data, in the third period P3. For example, the image sensor 200 may perform a state code measurement operation and a state code calculation operation during the third period P3. The image sensor 200 may determine dark current codes on the basis of the state codes related to the individual pixels PX determined in the third period P3, and compensate the image data item generated in the second period P2, on the basis of the dark current codes.

In some embodiments, the image sensor 200 may perform compensation by applying the dark current codes, determined with respect to the individual pixels PX in the third period P3, to a plurality of frame periods.

Figure 7:
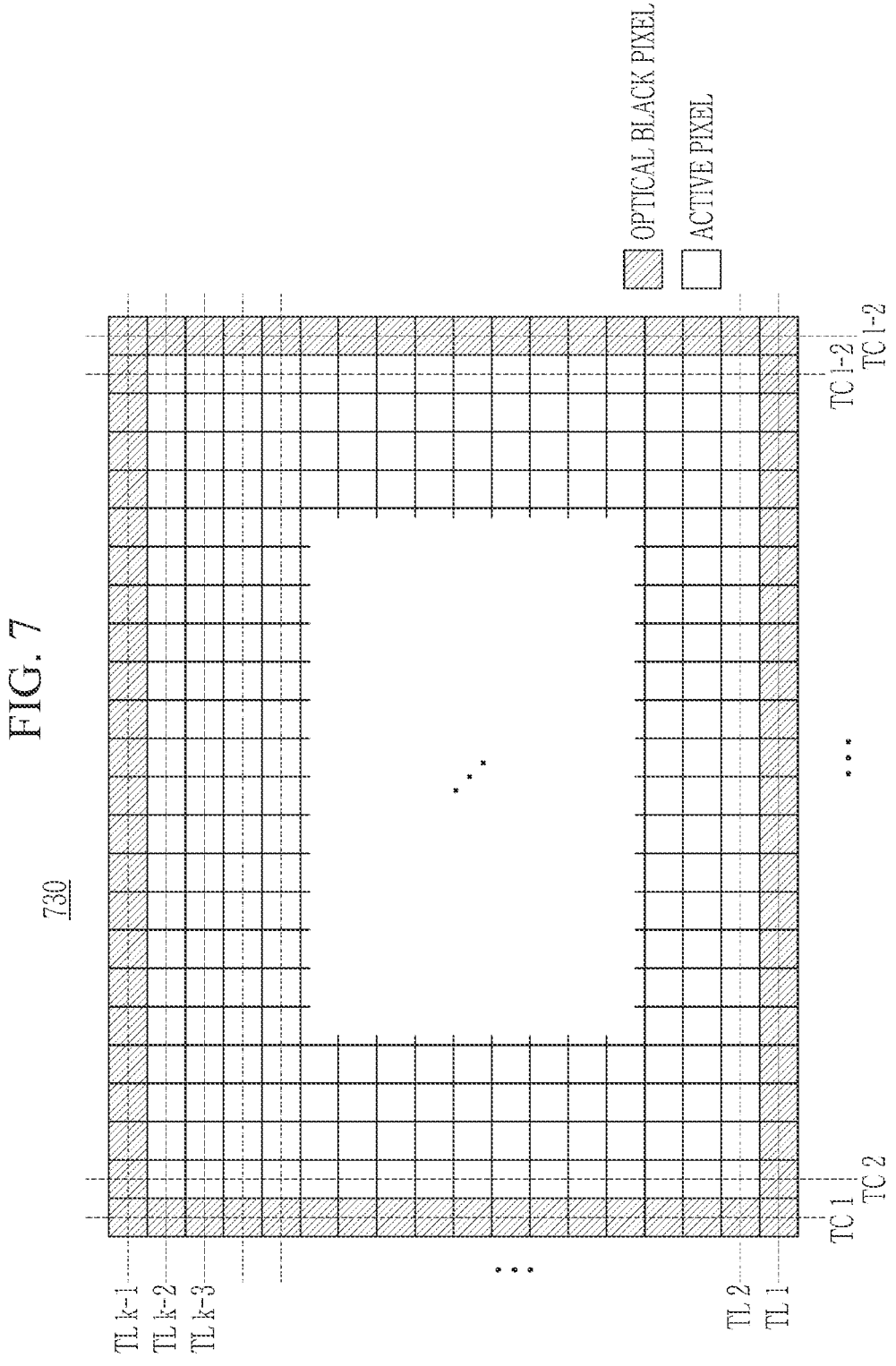
FIG. 7 is a view illustrating a pixel array according to an embodiment.

FIG. 7 is a view illustrating a pixel array according to an embodiment.

As described above, the characteristics of pixels PX may be determined by the process, and the temperatures of pixels PX may be determined by the positions of the pixels PX in an image sensor (reference symbol "200" in FIG. 2). Accordingly, the state codes and dark current codes of individual pixels PX arranged close to one another may have similar values.

As shown in FIG. 7, a pixel array 730 may include a plurality of pixels. As shown in FIG. 7, the pixel array 730 may include a plurality of pixel groups. An image sensor (reference symbol "200" in FIG. 2) may measure the state code and dark current code of a representative pixel in one pixel group. Thereafter, the image sensor 200 may generate a compensation table that includes the state code and dark current code of the representative pixel. During image data compensation, the image sensor 200 may equally apply the state code and dark current code of a representative pixel in a pixel group including a corresponding pixel. In other words, the image sensor 200 may determine a dark current code corresponding to the state code of the corresponding pixel in the compensation table generated on the basis of the state code and the dark current code calculated from the representative pixel, and compensate image data related to the corresponding pixel, using the determined dark current code. Accordingly, although the image sensor 200 does not measure the state codes and dark current codes of all pixels PX in the pixel array 730 in STEP S100, it can compensate image data.

Figure 8:
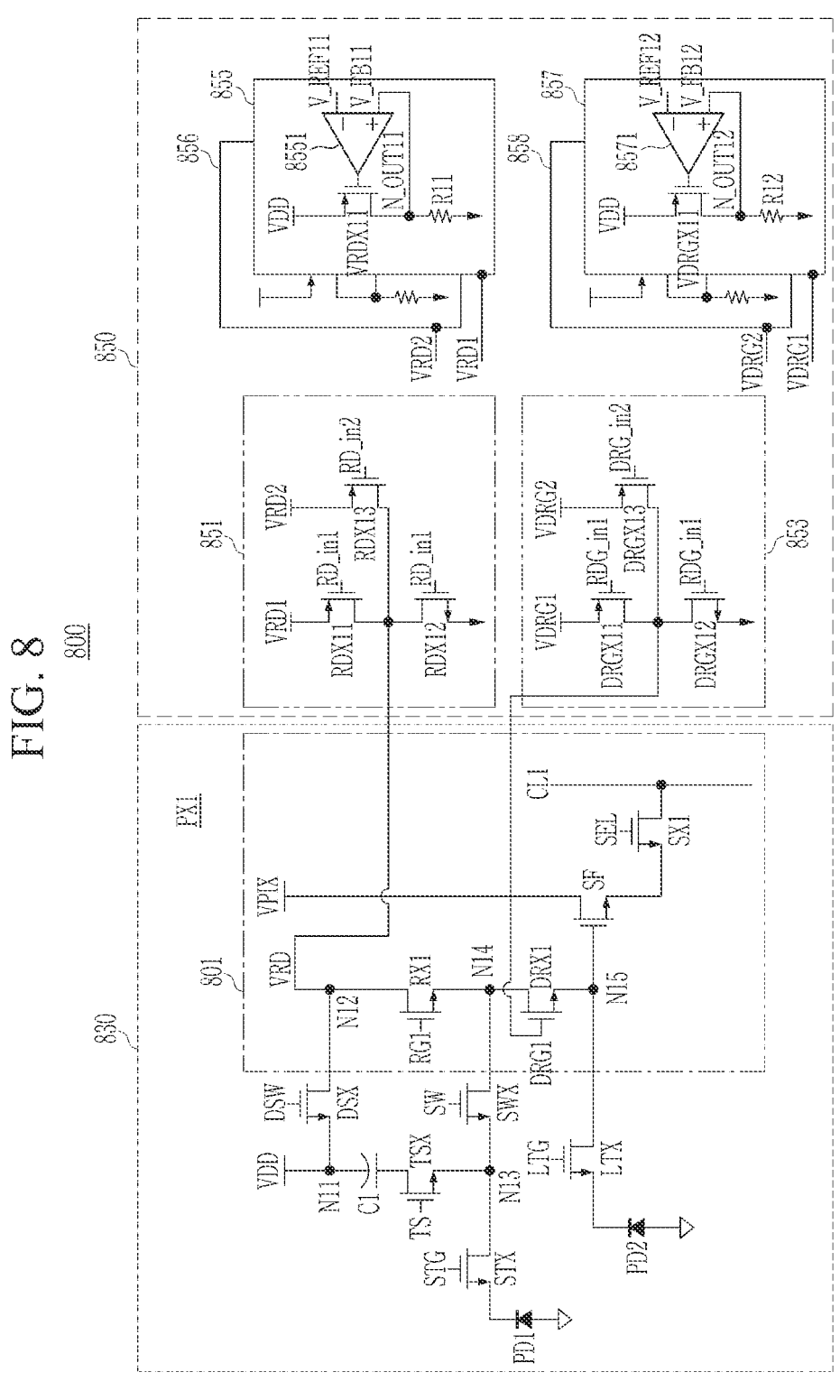
FIG. 8 is a circuit diagram illustrating an image sensor according to an embodiment.

FIG. 8 is a circuit diagram illustrating an image sensor according to an embodiment.

Specifically, FIG. 8 is a view illustrating one pixel PX1 in a pixel array 830, and a state code measure module 850 coupled to the pixel PX1. An image sensor 800 according to an embodiment may further include a timing controller, a readout circuit, a data buffer, etc.

Referring to FIG. 8, the pixel PX1 may include photoelectric elements PD1 and PD2, a first capacitor C1, and a plurality of transistors. In FIG. 8, it is shown that one pixel PX1 includes two photoelectric elements PD1 and PD2; however, the present embodiment is not limited thereto, and one pixel PX1 may include a plurality of photoelectric elements.

The cathode of the photoelectric element PD1 may be coupled to a third node N13 through a transfer transistor STX, and the anode of the photoelectric element PD1 may be grounded. Further, the cathode of the photoelectric element PD2 may be coupled to a fifth node N15 through a transfer transistor LTX, and the anode of the photoelectric element PD2 may be grounded.

The plurality of transistors may include the transfer transistors STX and LTX, a first transistor TSX, a first switch transistor SWX, a second switch transistor DSX, a reset transistor RX1, a gain control transistor DRX1, a drive transistor SF, and a selection transistor SX1. The transistors STX, LTX, TSX, SWX, DSX, RX1, DRX1, and SX1 in the pixel PX1 may operate in response to control signals which are provided from a row driver (reference symbol "240" in FIG. 2) and the state code measure module 850, for example, transfer control signals STG, LTG, TS, SW, and DRW, a selection signal SEL, a reset control signal RG1, and a first gain control signal DRG1.

The transfer transistor STX may be coupled between the photoelectric element PD1 and a third node N13 and be controlled by the transfer control signal STG. When the transfer transistor STX is turned on, charge generated by the photoelectric element PD1 can be transferred to the third node N13.

The transfer transistor LTX may be coupled between the photoelectric element PD2 and the fifth node N15, and be controlled by the transfer control signal LTG. When the transfer transistor LTX is turned on, charge generated by the photoelectric element PD2 may be transferred to the fifth node N15. The transfer transistor STX may be turned off in response to the deactivated transfer control signal STG, and the transfer transistor LTX may be turned off in response to the deactivated transfer control signal LTG. While the transfer transistors STX and LTX are off, i.e., during an exposure time, the photoelectric elements PD1 and PD2 may accumulate charge depending on incident light.

In some embodiments, the pixel PX1 may include a plurality of floating diffusions. Each of the plurality of floating diffusions may have predetermined capacitance, and be able to store charge generated by the photoelectric elements PD1 and PD2. Each of the plurality of floating diffusions may have parasitic capacitance. In some embodiments, the pixel PX1 may further include capacitors as passive elements coupled to the plurality of floating diffusions, respectively.

Charge generated by the photoelectric element PD1 may be accumulated in the first capacitor C1 through the first transistor TSX. The first transistor TSX may be controlled by the transfer control signal TS. The voltage of the third node N13 may be determined according to charge accumulated in the first capacitor C1 and charge generated by the photoelectric element PD1. Conversion gain which is the rate at which charge is converted into voltage may decrease as the magnitude of the capacitance of the first capacitor C1 increases. For example, as the capacitance of the first capacitor C1 increases, the conversion gain decreases, and as the capacitance decreases, the conversion gain increases.

One side of the first capacitor C1 is coupled to one end of the first transistor TSX, and the other side of the first capacitor C1 is coupled to a first node N11. The first node N11 may be coupled to a power supply voltage line which supplies power supply voltage VDD.

The first switch transistor SWX may be coupled between the third node N13 and a fourth node N14, and be controlled by the transfer control signal SW. When the first switch transistor SWX is turned on, the voltage of the third node N13 can be transferred to the fourth node N14.

The reset transistor RX1 may be coupled between the fourth node N14 and a voltage line that supplies reset voltage VRD, and be controlled by the reset control signal RG1. When the reset transistor RX1 is turned on by the reset control signal RG1, the reset voltage VRD can be applied to the fourth node N14 such that the fourth node N14 is reset. While the reset transistor RX1 is on, if a switch transistor SW1 and the gain control transistor DRX1 are turned on, both of the fourth node N14 and the fifth node N15 can be reset to the reset voltage VRD. The reset voltage VRD may be voltage generated from a reset voltage generation module 851.

The second switch transistor DSX may be coupled between the first node N11 and the second node N12, and be controlled by a switching signal DSW. When the second switch transistor DSX is turned on, the voltages of the first node N11 and the second node N12 may be the same.

The gain control transistor DRX1 may be coupled between the fourth node N14 and the fifth node N15, and be turned on by the gain control signal DRG1. When the gain control transistor DRX1 is turned on, the fourth node N14 and the fifth node N15 can be coupled.

The gate of the drive transistor SF is coupled to the fifth node N15. The drive transistor SF may operate as a source-follower amplifier with respect to the voltage of the fifth node N15. The drive transistor SF may output the pixel voltage to a column line CL1 through the selection transistor SX1 in response to the voltage of the fifth node N15.

The selection transistor SX1 may be coupled between the drive transistor SF and the column line CL1, and be controlled by the selection signal SEL. When the selection transistor SX1 is turned on, the pixel voltage which is output from the drive transistor SF can be output to a readout circuit (reference symbol "260" in FIG. 2) through the column line CL1 coupled to the selection transistor SX1.

The gain control transistor DRX1 may be coupled between the fourth node N14 and the fifth node N15, and be controlled by the first gain control signal DRG1.

The voltage of the fifth node N15 may depend on charge accumulated in the photoelectric elements PD1 and PD2, and may be expressed as the product of charge accumulated in the photoelectric elements PD1 and PD2 and the conversion gain. The voltage of the fifth node N15 corresponding to the same amount of charge may differ depending on whether the first gain control signal DRG1 is active or not, and may vary according to the first gain control signal DRG1. In other words, when the first gain control signal DRG1 is inactive, the pixel PX1 may have a high conversion gain (HCG), whereas when the first gain control signal DRG1 is active, the pixel PX1 may have a relatively low conversion gain (LCG). As described above, the pixel PX1 which provides two different conversion gains may be referred to as a dual conversion gain (DCG) pixel.

The state code measure module 850 may be coupled to the pixel PX1. The state code measure module 850 may provide the reset voltage VRD to the second node N12, and provide the first gain control signal DRG1 to the gate of the gain control transistor DRX1. The row driver may also be coupled to the pixel PX1 to provide the power supply voltage VDD and pixel power supply voltage VPIX.

Specifically, the state code measure module 850 may include the reset voltage generation module 851, a gain control signal generation module 853, a first reset signal regulator 855, a second reset signal regulator 856, a first gain control regulator 857, and a second gain control regulator 858. Each of the state code measure module 850, the reset voltage generation module 851, the gain control signal generation module 853, the first reset signal regulator 855, the second reset signal regulator 856, the first gain control regulator 857, and the second gain control regulator 858 may be physically implemented by analog and/or digital circuits including one or more of a logic gate, an integrated circuit, a microprocessor, a microcontroller, a memory circuit, a passive electronic component, an active electronic component, and the like.

The reset voltage generation module 851 may include a first reset voltage transistor RDX11, a second reset voltage transistor RDX12, and a third reset voltage transistor RDX13. The first reset voltage transistor RDX11 and the third reset voltage transistor RDX13 may be formed of a first type of transistors. The second reset voltage transistor RDX12 may be formed of a second type of transistor. For example, the first type of transistors may be P-type transistors, and the second type of transistor may be an N-type transistor. The drain of the first reset voltage transistor RDX11, the drain of the second reset voltage transistor RDX12, and the drain of the third reset voltage transistor RDX13 may be coupled to the second node N12. The source of the first reset voltage transistor RDX11 may be coupled to the output terminal of the first reset signal regulator 855. The source of the second reset voltage transistor RDX12 may be coupled to ground voltage. The source of the third reset voltage transistor RDX13 may be coupled to the output terminal of the second reset signal regulator 856.

The first reset signal regulator 855 may include an operational amplifier 8551, a pass transistor VRDX11, and a first resistor R11.

To a first terminal of the operational amplifier 8551, reference voltage V_REF11 may be provided. The reference voltage V_REF11 may be generated based on the power supply voltage VDD. A second terminal of the operational amplifier 8551 may be coupled to an output node N_OUT11. The reference voltage V_REF11 may be determined by a voltage drop from the power supply voltage VDD which is caused by any resistor and any transistor. In some embodiments, the pass transistor VRDX11 may be a first type of transistor. For example, the first type of transistor may be a P-type transistor.

The first resistor R11 may be coupled in series between the output node N_OUT11 of the first reset signal regulator 855 and a ground node. In other words, the voltage of the output node N_OUT11 may be input as feedback voltage V_FB11 to the second terminal of the operational amplifier 8551.

The operational amplifier 8551 may amplify the difference between the reference voltage V_REF11 which is input to the first terminal and the feedback voltage V_FB11 which is input to the second terminal, and the output of the operational amplifier 8551 may be input to the gate of the pass transistor VRDX11 to drive the pass transistor VRDX11. The second terminal of the operational amplifier 8551 may be coupled to the output node N_OUT11 of the first reset signal regulator 855, and the feedback voltage V_FB11 may be the output voltage VRD1 of the first reset signal regulator 855.

The second reset signal regulator 856 may include the same configuration as that of the first reset signal regulator 855. The second reset signal regulator 856 may output output voltage VRD2.

On the other hand, in FIG. 8, it is shown that first reset voltage VRD1 to be applied to the reset voltage generation module 851 is generated by the first reset signal regulator 855 and second reset voltage VRD2 is generated by the second reset signal regulator 856; however, the disclosure is not limited thereto, and the first reset voltage VRD1 and the second reset voltage VRD2 may be generated by one regulator. For example, when a regulator includes two resistors coupled in series, it can generate two different output voltages, using voltage drops which are caused by the resistors.

The gain control signal generation module 853 may include a first gain control transistor DRGX11, a second gain control transistor DRGX12, and a third gain control transistor DRGX13. The first gain control transistor DRGX11 and the third gain control transistor DRGX13 may be formed of a first type of transistors. The second gain control transistor DRGX12 may be formed of a second type of transistor. For example, the first type of transistors may be P-type transistors, and the second type of transistor may be an N-type transistor. The drain of the first gain control transistor DRGX11, the drain of the second gain control transistor DRGX12, and the drain of the third gain control transistor DRGX13 may be coupled to the gate of the gain control transistor DRX1. The source of the first gain control transistor DRGX11 may be coupled to the output terminal of the first gain control regulator 857. The source of the second gain control transistor DRGX12 may be coupled to the ground voltage. The source of the third gain control transistor DRGX13 may be coupled to the output terminal of the second gain control regulator 858.

The first gain control regulator 857 may include an operational amplifier 8571, a pass transistor VDRGX11, and a first resistor R12.

To a first terminal of the operational amplifier 8571, reference voltage V_REF12 may be provided. The reference voltage V_REF12 may be generated based on the power supply voltage VDD. A second terminal of the operational amplifier 8571 may be coupled to an output node N_OUT12. The reference voltage V_REF12 may be determined by a voltage drop from the power supply voltage VDD which is caused by any resistor and any transistor. In some embodiments, the pass transistor VDRGX11 may be a first type of transistor. For example, the first type of transistor may be a P-type transistor.

The first resistor R12 may be coupled in series between the output node N_OUT12 of the first gain control regulator 857 and the ground node. In other words, the voltage of the output node N_OUT12 may be input as feedback voltage V_FB12 to the second terminal of the operational amplifier 8571.

The operational amplifier 8571 may amplify the difference between the reference voltage V_REF12 which is input to the first terminal and the feedback voltage V_FB12 which is input to the second terminal, and the output of the operational amplifier 8571 may be input to the gate of the pass transistor VDRGX11 to drive the pass transistor VDRGX11. The second terminal of the operational amplifier 8571 may be coupled to the output node N_OUT12 of the first gain control regulator 857, and the feedback voltage V_FB12 may be the output voltage VDRG1 of the first gain control regulator 857.

The second gain control regulator 858 may include the same configuration as that of the first gain control regulator 857. The second gain control regulator 858 may output output voltage VDRG2.

On the other hand, in FIG. 8, it is shown that first gain voltage VDRG1 to be applied to the gain control signal generation module 853 is generated by the first gain control regulator 857 and second gain voltage VDRG2 is generated by the second gain control regulator 858; however, the disclosure is not limited thereto, and the first gain voltage VDRG1 and the second gain voltage VDRG2 may be generated by one regulator.

Figure 9:
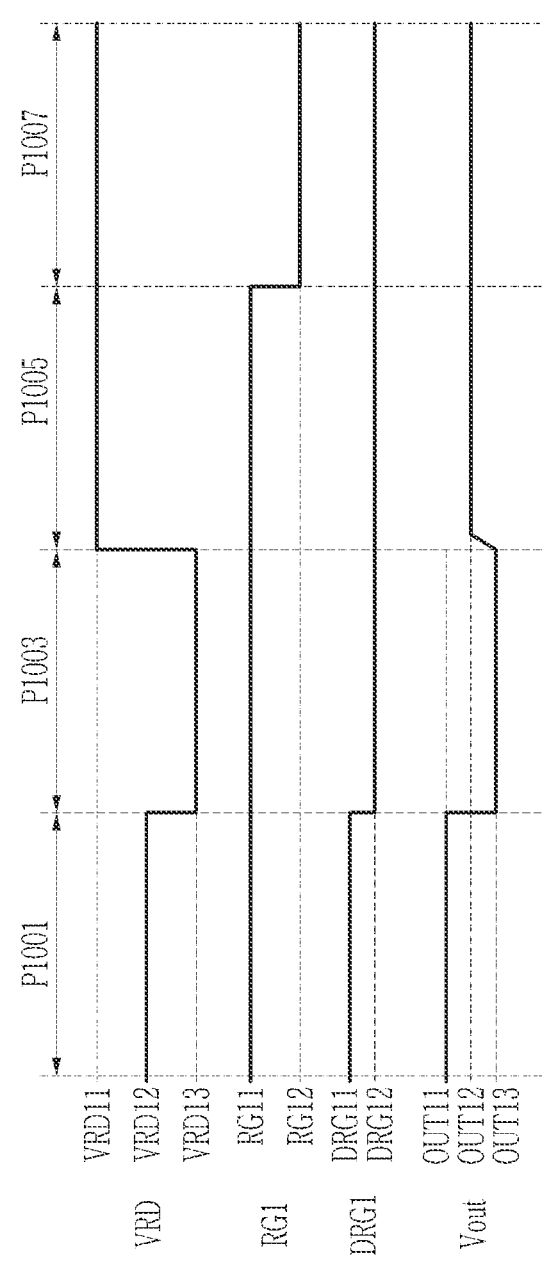
FIG. 9 is a timing chart illustrating the operation of the image sensor according to FIG. 8.
Figure 10:
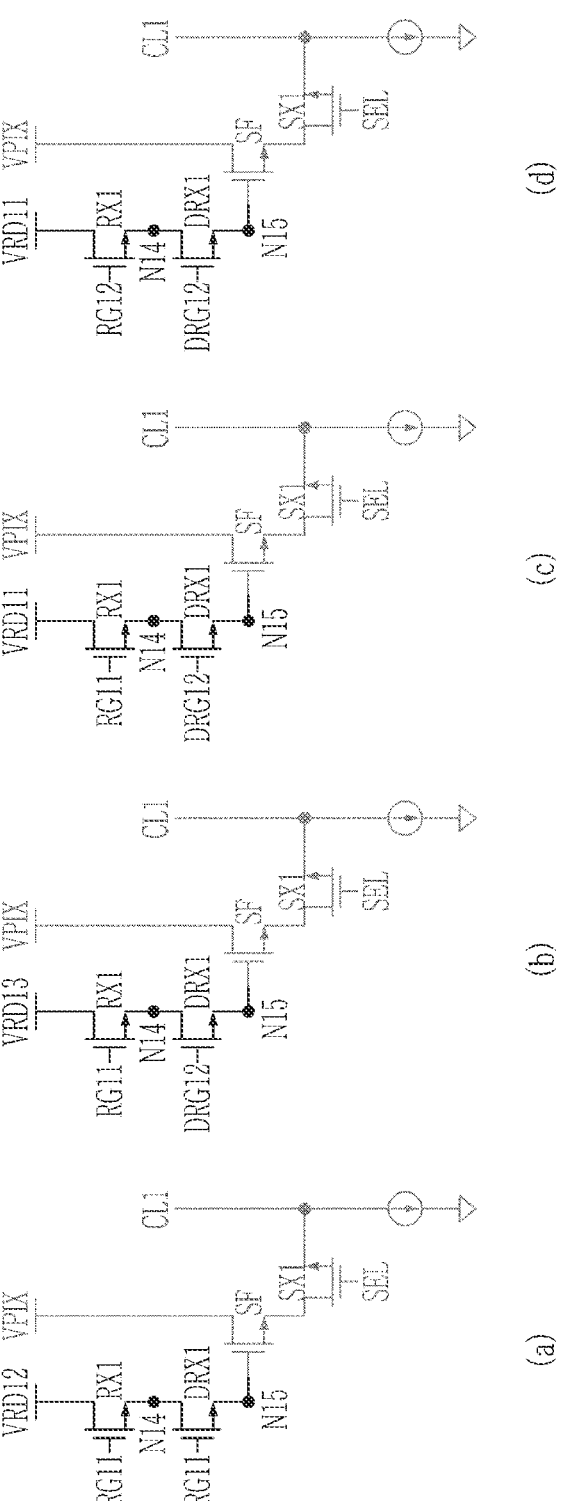
FIG. 10 is a view illustrating the circuit of the image sensor during the operation of the image sensor according to FIG. 9.

FIG. 9 is a timing chart illustrating the operation of the image sensor according to FIG. 8. FIG. 10 is a view illustrating the circuit of the image sensor during the operation of the image sensor according to FIG. 9.

The reset voltage VRD may have a first reset voltage value VRD11, a second reset voltage value VRD12, and a third reset voltage value VRD13. In some embodiments, the first reset voltage value VRD11 may be a voltage which is applied to the second node N12 when the first reset voltage transistor RDX11 and the third reset voltage transistor RDX13 are turned on and the second reset voltage transistor RDX12 is turned off. The second reset voltage value VRD12 may be a voltage which is applied to the second node N12 when the first reset voltage transistor RDX11 is turned off and the second reset voltage transistor RDX12 and the third reset voltage transistor RDX13 are turned on. The third reset voltage value VRD13 may be a voltage which is applied to the second node N12 when the first reset voltage transistor RDX11 and the third reset voltage transistor RDX13 are turned off and the second reset voltage transistor RDX12 is turned on. In some embodiments, the first reset voltage value VRD11 may be a voltage value when the first reset voltage VRD1 is applied as the reset voltage VRD, and the third reset voltage value VRD13 may be a voltage value when the second reset voltage VRD2 is applied as the reset voltage VRD, and the second reset voltage value VRD12 may be a voltage value when the first reset voltage VRD1 and the second reset voltage VRD2 are applied together as the reset voltage VRD.

The reset transistor RX1 may be turned on when the reset control signal RG1 has a first reset control level RG11, and may be turned off when the reset control signal RG1 has a second reset control level RG12.

The gain control transistor DRX1 may be turned on when the first gain control signal DRG1 has a first gain control level DRG11 and a second gain control level DRG12. In other words, the gain control transistor DRX1 may have a threshold voltage equal to or lower than the first gain control level DRG11 and the second gain control level DRG12.

In some embodiments, the first gain control level DRG11 may be a voltage which is applied to the gate of the gain control transistor DRX1 when the first gain control transistor DRGX11 and the third gain control transistor DRGX13 are turned on and the second gain control transistor DRGX12 is turned off. The second gain control level DRG12 may be a voltage which is applied to the gate of the gain control transistor DRX1 when the first gain control transistor DRGX11 is turned off and the second gain control transistor DRGX12 and the third gain control transistor DRGX13 are turned on. A third gain control level DRG13 may be a voltage which is applied to the gate of the gain control transistor DRX1 when the first gain control transistor DRGX11 and the third gain control transistor DRGX13 are turned off and the second gain control transistor DRGX12 is turned on.

Output voltage Vout may be a voltage at the fifth node N15 coupled to the gate of the drive transistor SF. The pixel voltage corresponding to the output voltage Vout may be transferred to the readout circuit (reference symbol "260" in FIG. 2) through the column line CL1.

First, in a first period P1001, the reset voltage VRD may have the second reset voltage value VRD12, and the reset control signal RG1 may have the first reset control level RG11, and the first gain control signal DRG1 may have the first gain control level DRG11.

Referring to FIG. 10 together, in the first period P1001, a first portion 801 may have the structure shown in (a) of FIG. 10.

The reset transistor RX1 may be turned on by the first gain control signal DRG1 at the first reset control level RG11, and the gain control transistor DRX1 may be turned on by the first gain control signal DRG1 at the first gain control level DRG11. Since the threshold voltage of the gain control transistor DRX1 is lower than the first gain control level DRG11, the gain control transistor DRX1 can be fully turned on. Accordingly, the fourth node N14 and the fifth node N15 may have the second reset voltage value VRD12. In other words, the fourth node N14 and the fifth node N15 may be reset by the reset voltage VRD, whereby the charge stored in the fourth node N14 and the fifth node N15 may be removed.

In the first period P1001, the output voltage Vout may have a first voltage value OUT11. In this case, the first voltage value OUT11 may be based on the second reset voltage value VRD12.

A first pixel voltage based on the first voltage value OUT11 may be transferred to the readout circuit (reference symbol "260" in FIG. 2) through the column line CL1.

In a second period P1003, the reset voltage VRD may have the third reset voltage value VRD13, and the reset control signal RG1 may have the first reset control level RG11, and the first gain control signal DRG1 may have the second gain control level DRG12.

Referring to FIG. 10, in the second period P1003, the first portion 801 may have the structure shown in (b) of FIG. 10.

The reset transistor RX1 may be turned on by the reset control signal RG1 at the first reset control level RG11, and the gain control transistor DRX1 may be turned on by the reset control signal RG1 at the second gain control level DRG12. Accordingly, the fourth node N14 and the fifth node N15 may have the third reset voltage value VRD13. Here, the third reset voltage value VRD13 may be a value smaller than a value smaller than the second reset voltage value VRD12 by the threshold voltage of the gain control transistor DRX1. For example, when the second reset voltage value VRD12 is 2.4 V and the threshold voltage of the gain control transistor DRX1 is 0.7 V, the third reset voltage value VRD13 may be a value smaller than 1.7 V.

The output voltage Vout may have a third voltage value OUT13. In this case, the third voltage value OUT13 may be based on the third reset voltage value VRD13.

A second pixel voltage based on the third voltage value OUT13 may be transferred to the readout circuit (reference symbol "260" in FIG. 2) through the column line CL1.

In a third period P1005, the reset voltage VRD may have the first reset voltage value VRD11, and the reset control signal RG1 may have the first reset control level RG11, and the first gain control signal DRG1 may have the second gain control level DRG12.

Referring to FIG. 10, in the third period P1005, the first portion 801 may have the structure shown in (c) of FIG. 10.

The reset transistor RX1 may be turned on by the first reset control level RG11, and the gain control transistor DRX1 may be turned on by the second gain control level DRG12. On the other hand, as the reset voltage VRD increases from the third reset voltage value VRD13 to the first reset voltage value VRD11, the voltage to be applied to the fourth node N14 and the fifth node N15 may increase. In this case, the gain control transistor DRX1 may be positioned in a triode region. The triode region may be a region in which with respect to the gain control transistor DRX1, when the drain-source voltage has a value smaller than the value which is obtained by subtracting the threshold voltage from the gate-source voltage, as the drain-source voltage of the transistor increases, the drain current value increases. In other words, when the voltage of the fifth node N15 which is the source side of the gain control transistor DRX1 is set to a low voltage, and the gate voltage of the gain control transistor DRX1 is raised to the second gain control level DRG12, the voltage of the fifth node N15 which is the source side of the gain control transistor DRX1 may rise to the value which is obtained by subtracting the threshold voltage from the second gain control level DRG12.

Accordingly, as the reset voltage VRD increases from the third reset voltage value VRD13 to the first reset voltage value VRD11, the output voltage Vout may increase from the third voltage value OUT13 to a second voltage value OUT12. Since the gain control transistor DRX1 is positioned in the triode region, the second voltage value OUT12 may be based on the value which is obtained by subtracting the threshold voltage of the gain control transistor DRX1 from the second gain control level DRG12.

A third pixel voltage based on the value which is obtained by subtracting the threshold voltage of the gain control transistor DRX1 from the second gain control level DRG12 may be transferred to the readout circuit (reference symbol "260" in FIG. 2) through the column line CL1.

On the other hand, in the third period P1005, the readout circuit may sample and process the third pixel voltage corresponding to the second voltage value OUT12. However, since the reset transistor RX1 and the gain control transistor DRX1 are on, when the image sensor operates under a high-temperature condition, the second voltage value OUT12 may be affected by reset voltage VRD11.

In a fourth period P1007, the reset voltage VRD may have the first reset voltage value VRD11, and the reset control signal RG1 may have the second reset control level RG12, and the first gain control signal DRG1 may have the second gain control level DRG12.

Referring to FIG. 10, in the fourth period P1007, the first portion 801 may have the structure shown in (d) of FIG. 10.

The reset transistor RX1 may be turned off by the second reset control level RG12, and the gain control transistor DRX1 may be turned on by the second gain control level DRG12. By turning off the reset transistor RX1, the second voltage value OUT12 may be less likely to be affected by the reset voltage VRD11. Accordingly, the readout circuit (reference symbol "260" in FIG. 2) may more accurately sample and process the third pixel voltage corresponding to the second voltage value OUT12.

The readout circuit (reference symbol "260" in FIG. 2) may sample the first pixel voltage in the first period P1001 to acquire a first code value corresponding to the first voltage value OUT11 based on the second reset voltage value VRD12, and may sample the third pixel voltage in the third period P1005 and the fourth period P1007 to acquire a second code value corresponding to the second voltage value OUT12 based on the value which is obtained by subtracting the threshold voltage of the gain control transistor DRX1 from the second reset voltage value VRD12. The readout circuit (reference symbol "260" in FIG. 2) may transmit the acquired first code value and the acquired second code value to the image signal processor (reference symbol "290" in FIG. 2).

The image signal processor (reference symbol "290" in FIG. 2) may calculate a state code which is a code value related to the threshold voltage of the gain control transistor DRX1, by subtracting the first code value from the acquired second code value.

Figure 11:
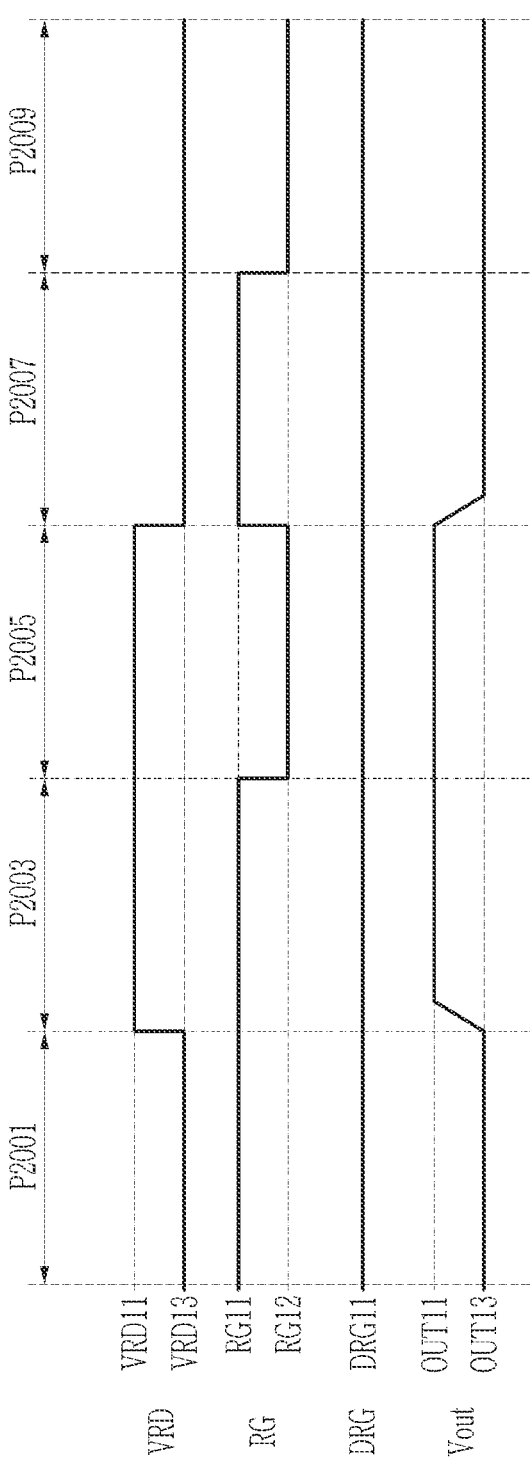
FIG. 11 is a timing chart illustrating the operation of the image sensor according to FIG. 8.
Figure 12:
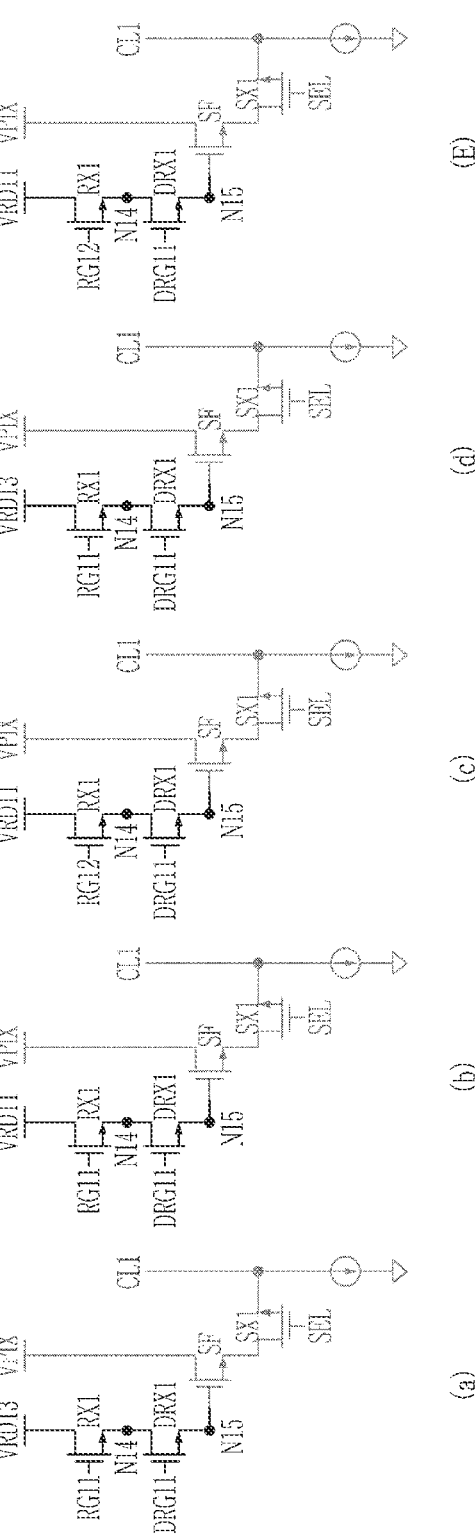
FIG. 12 is a view illustrating the circuit of the image sensor during the operation of the image sensor according to FIG. 11.

FIG. 11 is a timing chart illustrating the operation of the image sensor according to FIG. 8. FIG. 12 is a view illustrating the circuit of the image sensor during the operation of the image sensor according to FIG. 11.

The reset voltage VRD may have the first reset voltage value VRD11 and the third reset voltage value VRD13. In some embodiments, the first reset voltage value VRD11 may be the voltage which is applied to the second node N12 when the first reset voltage transistor RDX11 and the third reset voltage transistor RDX13 are turned on and the second reset voltage transistor RDX12 is turned off. The third reset voltage value VRD13 may be the voltage which is applied to the second node N12 when the first reset voltage transistor RDX11 and the third reset voltage transistor RDX13 are turned off and the second reset voltage transistor RDX12 is turned on.

The reset transistor RX1 may be turned on when the reset control signal RG1 has the first reset control level RG11, and be turned off when the reset control signal has the second reset control level RG12.

The gain control transistor DRX1 may be turned on when the first gain control signal DRG1 has the first gain control level DRG11 and the second gain control level DRG12. In other words, the gain control transistor DRX1 may have a threshold voltage lower than the first gain control level DRG11 and the second gain control level DRG12.

The output voltage Vout may be the voltage that is applied to the fifth node N15 coupled to the gate of the drive transistor SF. A pixel voltage corresponding to the output voltage Vout may be transferred to the readout circuit (reference symbol "260" in FIG. 2) through the column line CL1.

First, in a first period P2001, the reset voltage VRD may have the third reset voltage value VRD13, and the reset control signal RG1 may have the first reset control level RG11, and the first gain control signal DRG1 may have the first gain control level DRG11.

Referring to FIG. 12 together, in the first period P2001, the first portion 801 may have the structure shown in (a) of FIG. 12.

The reset transistor RX1 may be turned on by the first reset control level RG11, and the gain control transistor DRX1 may be turned on by the first gain control level DRG11. Since the threshold voltage of the gain control transistor DRX1 is lower than the first gain control level DRG11, the gain control transistor DRX1 may be fully turned on. Accordingly, the fourth node N14 and the fifth node N15 may have the third reset voltage value VRD13. In other words, the fourth node N14 and the fifth node N15 may be reset by the reset voltage, whereby the charge stored in the fourth node N14 and the fifth node N15 may be removed.

In the first period P1001, the output voltage Vout may have the third voltage value OUT13. In this case, the third voltage value OUT13 may be based on the third reset voltage value VRD13.

The first pixel voltage based on the third voltage value OUT13 may be transferred to the readout circuit (reference symbol "260" in FIG. 2) through the column line CL1.

Here, the third reset voltage value VRD13 may be a value smaller than the value smaller than the threshold voltage of the first gain control level DRG11 by the gain control transistor DRX1.

In a second period P2003, the reset voltage VRD may have the first reset voltage value VRD11, and the reset control signal RG1 may have the first reset control level RG11, and the first gain control signal DRG1 may have the first gain control level DRG11.

Referring to FIG. 12, in the second period P2003, the first portion 801 may have the structure shown in (b) of FIG. 12.

The reset transistor RX1 may be turned on by the first reset control level RG11, and the gain control transistor DRX1 may be turned on by the first gain control level DRG11. Accordingly, voltage which increases to have the first reset voltage value VRD11 may be applied to the fourth node N14 and the fifth node N15. On the other hand, since the gain control transistor DRX1 is positioned in the triode region, the voltage which is obtained by subtracting the threshold voltage of the gain control transistor DRX1 from the first gain control level DRG11 may be applied to the fourth node N14 and the fifth node N15. In other words, when the voltage of the fifth node N15 which is the source side of the gain control transistor DRX1 is set to a low voltage, and the voltage of the fourth node N14 which is the drain side of the gain control transistor DRX1 is raised, the voltage of the fifth node N15 which is the source side of the gain control transistor DRX1 may rise to the value which is obtained by subtracting the threshold voltage from the first gain control level DRG11 which is the gate voltage of the gain control transistor DRX1.

Accordingly, as the reset voltage VRD increases from the third reset voltage value VRD13 to the first reset voltage value VRD11, the output voltage Vout may increase from the third voltage value OUT13 to the first voltage value OUT11. Since the gain control transistor DRX1 is positioned in the triode region, the first voltage value OUT11 may be the value which is obtained by subtracting the threshold voltage from the first gain control level DRG11.

The second pixel voltage based on the value that is obtained by subtracting the threshold voltage of the gain control transistor DRX1 from the first gain control level DRG11 may be transferred to the readout circuit (reference symbol "260" in FIG. 2) through the column line CL1.

In a third period P2005, the reset voltage VRD may have the first reset voltage value VRD11, and the reset control signal RG1 may have the second reset control level RG12, and the first gain control signal DRG1 may have the first gain control level DRG11.

Referring to FIG. 12, in the third period P2005, the first portion 801 may have the structure shown in (c) of FIG. 12.

The reset transistor RX1 may be turned off by the second reset control level RG12, and the gain control transistor DRX1 may be turned on by the first gain control level DRG11. By turning off the reset transistor RX1, the first voltage value OUT11 may be less likely to be affected by the reset voltage VRD11. Accordingly, the readout circuit (reference symbol "260" in FIG. 2) may more accurately sample and process the third pixel voltage corresponding to the first voltage value OUT11.

In a fourth period P2007, the reset voltage VRD may have the third reset voltage value VRD13, and the reset control signal RG1 may have the first reset control level RG11, and the first gain control signal DRG1 may have the first gain control level DRG11.

Referring to FIG. 12, in the fourth period P2007, the first portion 801 may have the structure shown in (d) of FIG. 12.

The reset transistor RX1 may be turned on by the first reset control level RG11, and the gain control transistor DRX1 may be turned on by the first gain control level DRG11.

As the reset voltage VRD decreases from the first reset voltage value VRD11 to the third reset voltage value VRD13, the voltage to be applied to the fourth node N14 and the fifth node N15 may decrease.

The fourth node N14 and the fifth node N15 may be reset by the reset voltage VRD having the third reset voltage value VRD13, whereby the charge stored in the fourth node N14 and the fifth node N15 may be removed.

Accordingly, the readout circuit (reference symbol "260" in FIG. 2) may sample and process fourth pixel voltage corresponding to the third voltage value OUT13.

In a fifth period P2009, the reset voltage VRD may have the third reset voltage value VRD13, and the reset control signal RG1 may have the second reset control level RG12, and the first gain control signal DRG1 may have the first gain control level DRG11.

Referring to FIG. 12, in the fifth period P2009, the first portion 801 may have the structure shown in (e) of FIG. 12.

The reset transistor RX1 may be turned off by the second reset control level RG12, and the gain control transistor DRX1 may be turned on by the first gain control level DRG11. By turning off the reset transistor RX1, the third voltage value OUT13 may be less likely to be affected by reset voltage VRD13. Accordingly, the readout circuit (reference symbol "260" in FIG. 2) may more accurately sample and process fifth pixel voltage corresponding to the third voltage value OUT13.

The readout circuit (reference symbol "260" in FIG. 2) may acquire a first code value corresponding to the first voltage value OUT11 based on the value by subtracting the threshold voltage from the first gain control level DRG11 by sampling the third pixel voltage in the third period P2005. Also, the readout circuit (reference symbol "260" in FIG. 2) may acquire the second code value corresponding to the third voltage value OUT13 based on the third reset voltage value VRD 13 by sampling the fourth pixel voltage in the fourth period P2007 or acquire a second code value corresponding to the third voltage value OUT13 based on the third reset voltage value VRD13 by sampling the fifth pixel voltage and the fifth period P2009. The readout circuit (reference symbol "260" in FIG. 2) may transmit the acquired first code value and the acquired second code value to the image signal processor (reference symbol "290" in FIG. 2).

By subtracting the first code value from the acquired second code value, the image signal processor (reference symbol "290" in FIG. 2) may calculate a state code which is the code value related to the threshold voltage of the gain control transistor DRX1. By the way, the image signal processor (reference symbol "290" in FIG. 2) may calculate not only the state code but also a code related to the offset difference between the first gain control level DRG11 and the third reset voltage value VRD13.

Figure 13:
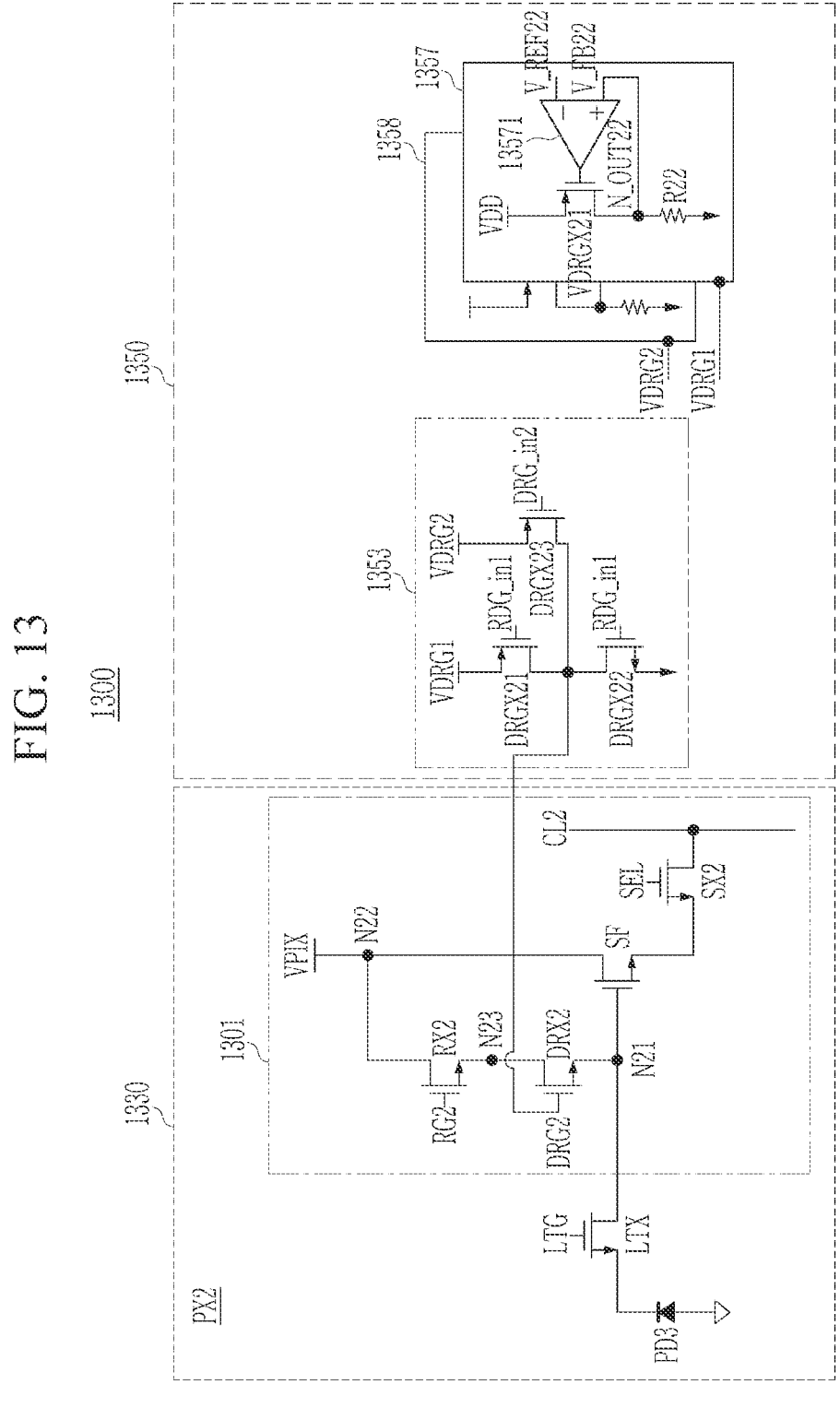
FIG. 13 is a circuit diagram illustrating an image sensor according to an embodiment.

FIG. 13 is a circuit diagram illustrating an image sensor according to an embodiment.

Specifically, FIG. 13 is a view illustrating one pixel PX2 in a pixel array 1330, and a state code measure module 1350 coupled to the pixel PX2. An image sensor 800 according to an embodiment may further include a timing controller, a readout circuit, a data buffer, etc.

The pixel PX2 may include a photoelectric element PD3 and a plurality of transistors. In FIG. 13, it is shown that one pixel PX2 includes one photoelectric element PD3; however, the present embodiment is not limited thereto, and one pixel PX2 may include a plurality of photoelectric elements.

The cathode of the photoelectric element PD3 may be coupled to a first node N21 through a transfer transistor LTX, and the anode of the photoelectric element PD3 may be grounded.

The plurality of transistors may include the transfer transistor LTX, a reset transistor RX2, a gain control transistor DRX2, a drive transistor SF, and a selection transistor SX2. The transistors LTX, RX2, DRX2, and SX2 in the pixel PX2 may operate in response to control signals which are provided from a row driver (reference symbol "240" in FIG. 2) and the state code measure module 1350, for example, a transfer control signal LTG, a selection signal SEL, a reset control signal RG2, and a gain control signal DRG2.

The transfer transistor LTX may be coupled between the photoelectric element PD3 and the first node N21, and be controlled by the transfer control signal LTG. When the transfer transistor LTX is turned on, charge generated by the photoelectric element PD3 may be transferred to the first node N21. The transfer transistor LTX may be turned off in response to the deactivated transfer control signal LTG. While the transfer transistor LTX is off, i.e., during an exposure time, the photoelectric element PD3 may accumulate charge depending on incident light.

In some embodiments, the pixel PX2 may include a plurality of floating diffusions. Each of the plurality of floating diffusions may have predetermined capacitance, and be able to store charge generated by the photoelectric element PD3. Each of the plurality of floating diffusions may have parasitic capacitance. In some embodiments, the pixel PX2 may further include capacitors as passive elements coupled to the plurality of floating diffusions, respectively.

The reset transistor RX2 may be coupled between a third node N23 and a voltage line that supplies pixel power supply voltage VPIX, and be controlled by the reset control signal RG2. When the reset transistor RX2 is turned on by the reset control signal RG2, the pixel power supply voltage VPIX can be applied to the third node N23 such that the third node N23 is reset. While the reset transistor RX2 is on, if the gain control transistor DRX2 is turned on, the first node N21 can be reset to the pixel power supply voltage VPIX.

The gain control transistor DRX2 may be coupled between the first node N21 and the third node N23, and be turned on by the gain control signal DRG2. When the gain control transistor DRX2 is turned on, the first node N21 and the third node N23 can be coupled.

The gate of the drive transistor SF is coupled to the first node N21. The drive transistor SF may operate as a source-follower amplifier with respect to the voltage of the first node N21. The drive transistor SF may output the pixel voltage to a column line CL2 through the selection transistor SX2 in response to the voltage of the first node N21.

The selection transistor SX2 may be coupled between the drive transistor SF and the column line CL2, and be controlled by the selection signal SEL. When the selection transistor SX2 is turned on, the pixel voltage which is output from the drive transistor SF can be output to a readout circuit (reference symbol "260" in FIG. 2) through the column line CL2 coupled to the selection transistor SX2.

The gain control transistor DRX2 may be coupled between the first node N21 and the third node N23, and be controlled by the gain control signal DRG2.

The state code measure module 1350 may be coupled to the pixel PX2. The state code measure module 1350 may provide the gain control signal DRG2 to the gate of the gain control transistor DRX2. The row driver may also be coupled to the pixel PX2 to provide the power supply voltage VDD and the pixel power supply voltage VPIX.

The state code measure module 1350 may include a gain control signal generation module 1353, a first gain control regulator 1357, and a second gain control regulator 1358.

The gain control signal generation module 1353 may include a first gain control transistor DRGX21, a second gain control transistor DRGX22, a third gain control transistor DRGX23. The first gain control transistor DRGX21 and the third gain control transistor DRGX23 may be formed of a first type of transistors. The second gain control transistor DRGX22 may be formed of a second type of transistor. For example, the first type of transistors may be P-type transistors, and the second type of transistor may be an N-type transistor. The drain of the first gain control transistor DRGX21, the drain of the second gain control transistor DRGX22, and the drain of the third gain control transistor DRGX23 may be coupled to the gate of the gain control transistor DRX2. The source of the first gain control transistor DRGX21 may be coupled to the output terminal of the first gain control regulator 1357. The source of the second gain control transistor DRGX22 may be coupled to the ground voltage. The source of the third gain control transistor DRGX23 may be coupled to the output terminal of the second gain control regulator 1358.

The first gain control regulator 1357 may include an operational amplifier 13571, a pass transistor VDRGX11, and a first resistor R12. To a first terminal of the operational amplifier 13571, reference voltage V_REF22 may be provided. The reference voltage V_REF22 may be generated based on the power supply voltage VDD. A second terminal of the operational amplifier 13571 may be coupled to an output node N_OUT22. The reference voltage V_REF22 may be determined by a voltage drop from the power supply voltage VDD which is caused by any resistor and any transistor. In some embodiments, the pass transistor VDRGX21 may be a first type of transistor. For example, the first type of transistor may be a P-type transistor.

The first resistor R22 may be coupled in series between the output node N_OUT22 of the first gain control regulator 1357 and the ground node. In other words, the voltage of the output node N_OUT22 may be input as feedback voltage V_FB22 to the second terminal of the operational amplifier 13571.

The operational amplifier 13571 may amplify the difference between the reference voltage V_REF22 which is input to the first terminal and the feedback voltage V_FB22 which is input to the second terminal, and the output of the operational amplifier 13571 may be input to the gate of the pass transistor VDRGX21 to drive the pass transistor VDRGX21. The second terminal of the operational amplifier 13571 may be coupled to the output node N_OUT22 of the first gain control regulator 1357, and the feedback voltage V_FB22 may be the output voltage VDRG1 of the first gain control regulator 1357.

The second gain control regulator 1358 may include the same configuration as that of the first gain control regulator 1357. The second gain control regulator 1358 may output output voltage VDRG2.

On the other hand, in FIG. 13, it is shown that first gain voltage VDRG1 to be applied to the gain control signal generation module 1353 is generated by the first gain control regulator 1357 and second gain voltage VDRG2 is generated by the second gain control regulator 1358; however, the disclosure is not limited thereto, and the first gain voltage VDRG1 and the second gain voltage VDRG2 may be generated by one regulator.

Figure 14:
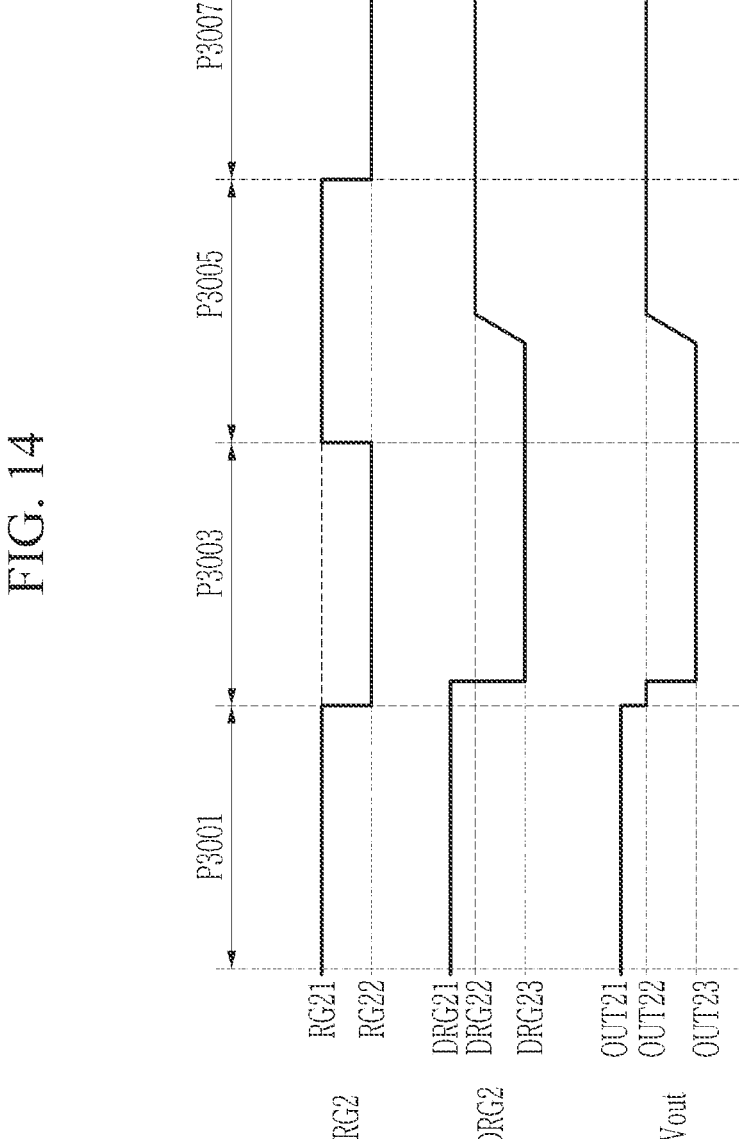
FIG. 14 is a timing chat illustrating the operation of the image sensor according to FIG. 13.
Figure 15:
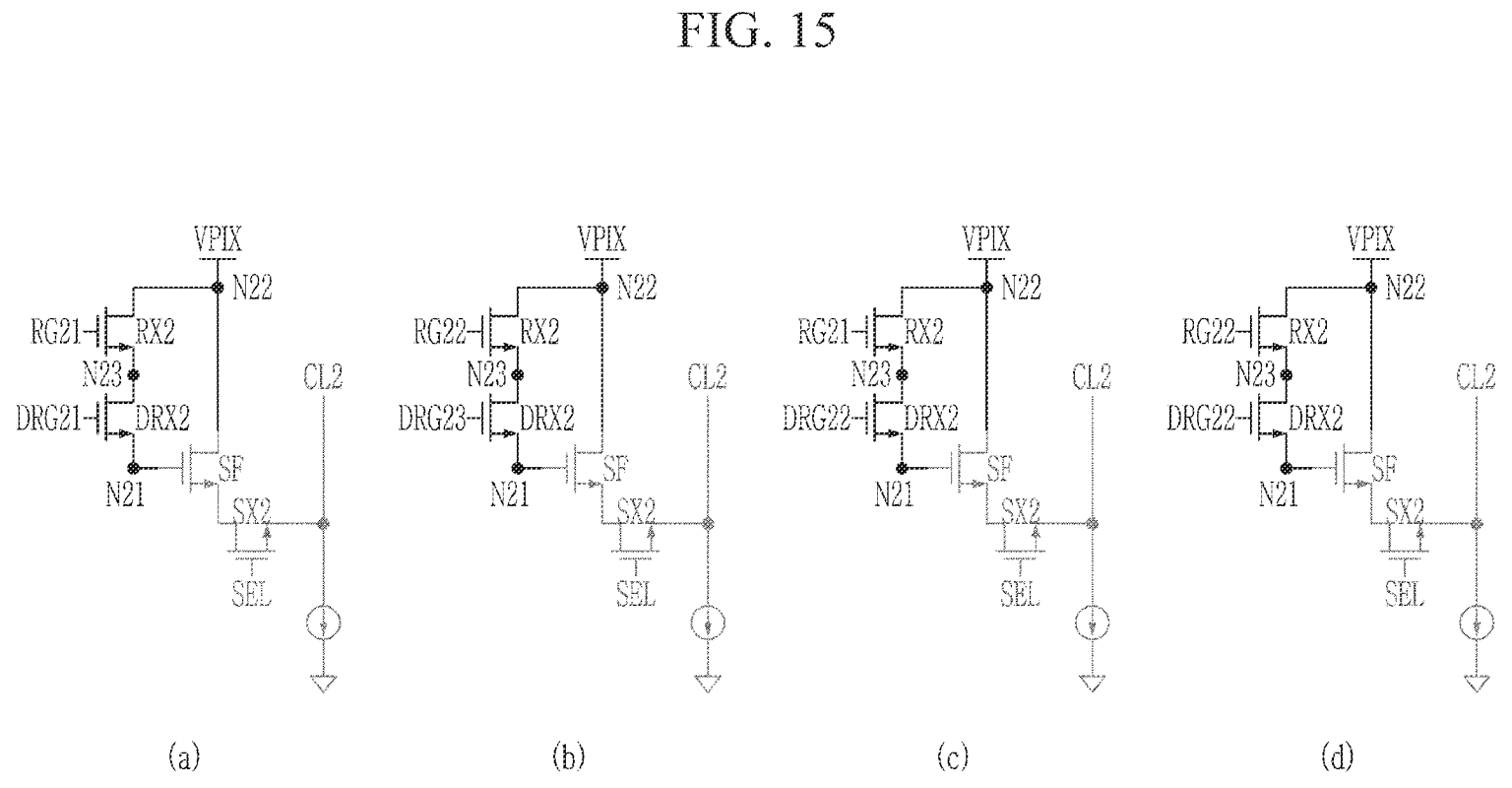

FIG. 14 is a timing chat illustrating the operation of the image sensor according to FIG. 13. FIG. 15 is a view illustrating the circuit of the image sensor during the operation of the image sensor according to FIG. 13.

The reset transistor RX2 may be turned on when the reset control signal RG2 has a first reset control level RG21, and may be turned off when the reset control signal RG2 has a second reset control level RG22.

The gain control transistor DRX2 may be turned on when the first gain control signal DRG2 has a first gain control level DRG21 and a second gain control level DRG22. Further, the gain control transistor DRX2 may be turned off when the first gain control signal DRG2 has a third gain control level DRG23. In other words, the gain control transistor DRX2 may have a threshold voltage equal to or lower than the first gain control level DRG21 and the second gain control level DRG22 and equal to or higher than the third gain control level DRG23.

In some embodiments, the first gain control level DRG21 may be a voltage which is applied to the gate of the gain control transistor DRX2 when the first gain control transistor DRGX21 and the third gain control transistor DRGX23 are turned on and the second gain control transistor DRGX22 is turned off. The second gain control level DRG22 may be a voltage which is applied to the gate of the gain control transistor DRX2 when the first gain control transistor DRGX21 is turned off and the second gain control transistor DRGX22 and the third gain control transistor DRGX23 are turned on. The third gain control level DRG23 may be a voltage which is applied to the gate of the gain control transistor DRX2 when the first gain control transistor DRGX21 and the third gain control transistor DRGX23 are turned off and the second gain control transistor DRGX22 is turned on.

Output voltage Vout may be a voltage at the first node N21 coupled to the gate of the drive transistor SF. The pixel voltage corresponding to the output voltage Vout may be transferred to the readout circuit (reference symbol "260" in FIG. 2) through the column line CL2.

First, in a first period P3001, the reset control signal RG2 may have the first reset control level RG21, and the gain control signal DRG2 may have the first gain control level DRG21.

Referring to FIG. 15 together, in the first period P3001, a first portion 1301 may have the structure shown in (a) of FIG. 15.

The reset transistor RX2 may be turned on by the first reset control level RG21, and the gain control transistor DRX2 may be turned on by the first gain control level DRG21. Since the threshold voltage of the gain control transistor DRX2 is lower than the first gain control level DRG21, the gain control transistor DRX2 can be fully turned on. Accordingly, the first node N21 and the third node N23 may have the pixel power supply voltage VPIX. In other words, the first node N21 and the third node N23 may be reset by the reset voltage, whereby the charge stored in the first node N21 and the third node N23 may be removed.

In the first period P3001, the output voltage Vout may have a first voltage value OUT11. In this case, the first voltage value OUT11 may be based on the pixel power supply voltage VPIX.

A first pixel voltage based on the first voltage value OUT11 may be transferred to the readout circuit (reference symbol "260" in FIG. 2) through the column line CL2.

In a second period P3003, the reset control signal RG2 may have the second reset control level RG22, and the gain control signal DRG2 may have the third gain control level DRG23 after a predetermined time from when the reset control signal RG2 transitions to the second reset control level RG22.

Referring to FIG. 15, in the second period P3003, the first portion 1301 may have the structure shown in (b) of FIG. 15.

The reset transistor RX2 may be turned off by the second reset control level RG22. Since the reset transistor RX2 and the gain control transistor DRX2 are on before the reset transistor RX2 is turned off, both of the first node N21 and the third node N23 may have the pixel power supply voltage VPIX. Accordingly, when the reset transistor RX2 and the gain control transistor DRX2 are turned off at the same time, due to the coupling phenomenon, the voltage of the first node N21 may decrease only by a voltage less than the voltage by which the voltage of the first node should decrease. Accordingly, the image sensor 200 may sequentially control the reset control signal RG2 and the gain control signal DRG2 such that the gain control signal has the third gain control level DRG23 after the predetermined time when the reset control signal transitions to the second reset control level RG22. Since the gain control transistor DRX2 is turned off in the state where the reset transistor RX2 is off, the first node N21 and the third node N23 can have lower voltages by the coupling while less affected by the pixel power supply voltage VPIX.

The gain control transistor DRX2 may be turned off by the third gain control level DRG23. Accordingly, the first node N21 and the third node N23 may have the second reset control level RG22.

The output voltage Vout may have a third voltage value OUT23. In this case, the third voltage value OUT23 may be based on the pixel power supply voltage VPIX.

A second pixel voltage based on the third voltage value OUT23 may be transferred to the readout circuit (reference symbol "260" in FIG. 2) through the column line CL2.

In a third period P3005, the reset control signal RG2 may have the first reset control level RG21, and the gain control signal DRG2 may have the third gain control level DRG23.

Referring to FIG. 15, in the third period P3005, the first portion 1301 may have the structure shown in (c) of FIG. 15.

The reset transistor RX2 may be turned on by the first reset control level RG21, and the gain control transistor DRX2 may be turned off by the third gain control level DRG23. On the other hand, the reset transistor RX2 may be turned on such that the third node N23 is coupled to the pixel power supply voltage VPIX.

In the third period P3005, the gain control signal DRG2 may be changed from the third gain control level DRG23 to the second gain control level DRG22 after a predetermined time from when the reset control signal RG2 transitions to the first reset control level RG21.

Since the gain control transistor DRX2 turned off by third gain control level DRG23 is turned on by the second gain control level DRG22, the voltage to be applied to the first node N21 can increase. In this case, the gain control transistor DRX2 may be positioned in a triode region. On the other hand, when the voltage of the first node N21 which is the source side of the gain control transistor DRX2 is set to a low voltage, and the gate voltage of the gain control transistor DRX2 is raised to the second gain control level DRG22, the voltage of the first node N21 which is the source side of the gain control transistor DRX2 may rise to the value which is obtained by subtracting the threshold voltage from the second gain control level DRG22 which is the gate voltage of the gain control transistor DRX2.

Accordingly, the output voltage Vout may increase from the third voltage value OUT23 to the second voltage value OUT22. Since the gain control transistor DRX2 is positioned in the triode region, the second voltage value OUT22 may be based on the value which is obtained by subtracting the threshold voltage of the gain control transistor DRX2 from the second gain control level DRG22.

A third pixel voltage based on the value which is obtained by subtracting the threshold voltage of the gain control transistor DRX2 from the second gain control level DRG22 may be transferred to the readout circuit (reference symbol "260" in FIG. 2) through the column line CL2.

On the other hand, in the third period P3005, the readout circuit may sample and process the third pixel voltage corresponding to the second voltage value OUT22. However, since the reset transistor RX2 and the gain control transistor DRX2 are on, when the image sensor operates under a high-temperature condition, the second voltage value OUT22 may be affected by the pixel power supply voltage VPIX.

In a fourth period P3007, the reset control signal RG2 may have the second reset control level RG22, and the gain control signal DRG2 may have the second gain control level DRG22.

Referring to FIG. 15, in the fourth period P3007, the first portion 1301 may have the structure shown in (d) of FIG. 15.

The reset transistor RX2 may be turned off by the second reset control level RG22, and the gain control transistor DRX2 may be turned on by the second gain control level DRG22. By turning off the reset transistor RX2, the second voltage value OUT22 may be less likely to be affected by the pixel power supply voltage VPIX. Accordingly, the readout circuit (reference symbol "260" in FIG. 2) may more accurately sample and process the third pixel voltage corresponding to the second voltage value OUT22.

The readout circuit (reference symbol "260" in FIG. 2) may sample the first pixel voltage in the first period P3001 to acquire a first code value corresponding to the first voltage value OUT21 based on the pixel power supply voltage VPIX, and may sample the third pixel voltage in a fifth period P3009 and a sixth period P3011 to acquire a second code value corresponding to the second voltage value OUT22 based on the value which is obtained by subtracting the threshold voltage of the gain control transistor DRX2 from the second gain control level DRG22. The readout circuit (reference symbol "260" in FIG. 2) may transmit the acquired first code value and the acquired second code value to the image signal processor (reference symbol "290" in FIG. 2).

By subtracting the first code value from the acquired second code value, the image signal processor (reference symbol "290" in FIG. 2) may calculate a state code which is the code value related to the threshold voltage of the gain control transistor DRX2. By the way, the image signal processor (reference symbol "290" in FIG. 2) may calculate not only the state code but also a code related to the offset difference between the pixel power supply voltage VPIX and the second gain control level DRG22.

Figure 16:
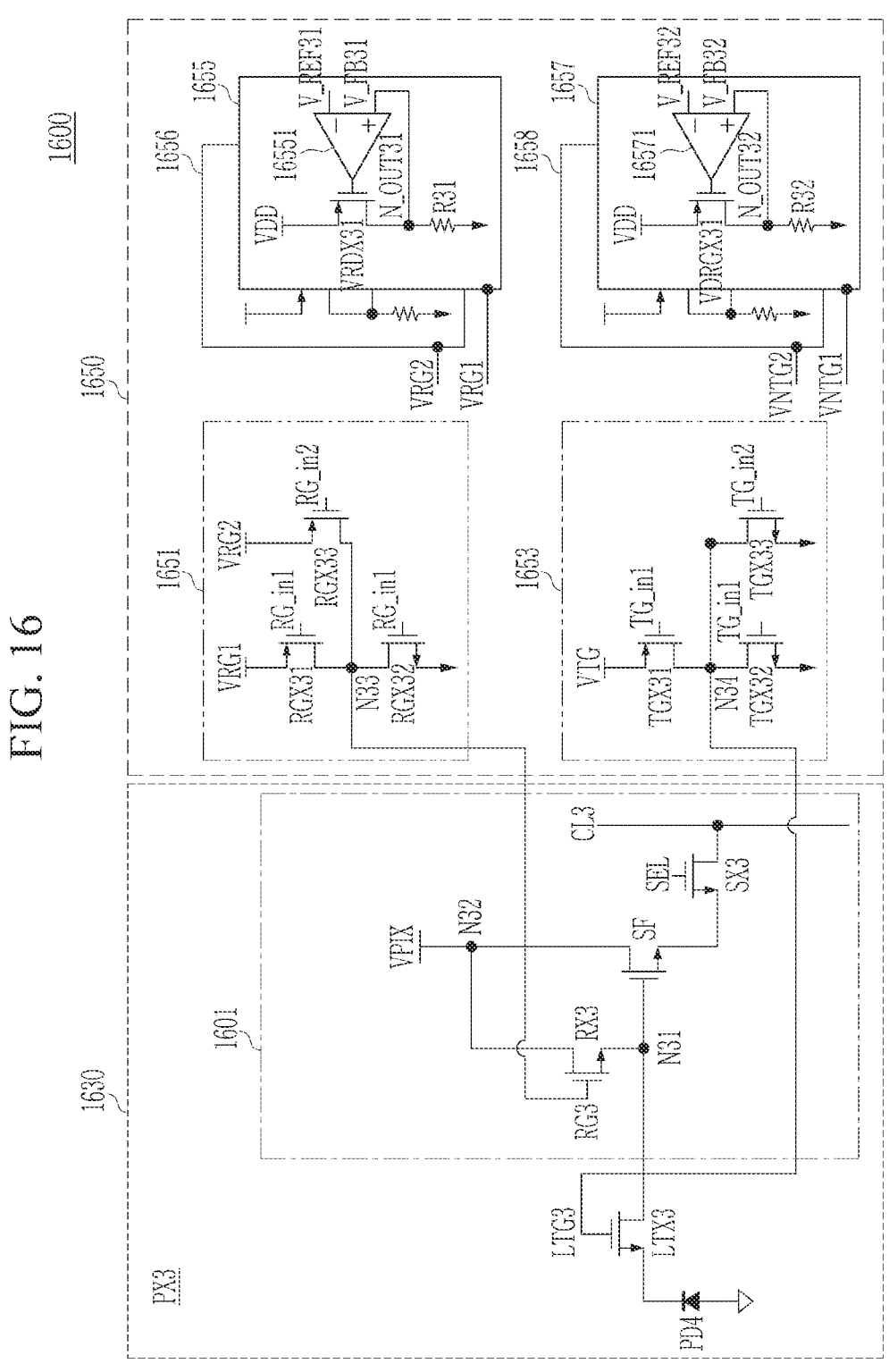
FIG. 16 is a circuit diagram illustrating an image sensor according to an embodiment.

FIG. 16 is a circuit diagram illustrating an image sensor according to an embodiment.

Specifically, FIG. 16 is a view illustrating one pixel PX3 in a pixel array 1630, and a state code measure module 1650 coupled to the pixel PX3. An image sensor 1600 according to an embodiment may further include a timing controller, a readout circuit, a data buffer, etc.

The pixel PX3 may include a photoelectric element PD4 and a plurality of transistors. In FIG. 16, it is shown that one pixel PX3 includes one photoelectric element PD4; however, the present embodiment is not limited thereto, and one pixel PX3 may include a plurality of photoelectric elements.

The cathode of the photoelectric element PD4 may be coupled to a first node N31 through a transfer transistor LTX, and the anode of the photoelectric element PD4 may be grounded.

The plurality of transistors may include a transfer transistor LTX3, a reset transistor RX3, a drive transistor SF, and a selection transistor SX3. The transistors LTX3, RX3, and SX3 in the pixel PX3 may operate in response to control signals which are provided from a row driver (reference symbol "240" in FIG. 2) and the state code measure module 1650, for example, a transfer control signal LTG3, a selection signal SEL, and a reset control signal RG3.

The transfer transistor LTX3 may be coupled between the photoelectric element PD4 and the first node N31, and be controlled by the transfer control signal LTG3. When the transfer transistor LTX3 is turned on, charge generated by the photoelectric element PD4 may be transferred to the first node N31. The transfer transistor LTX3 may be turned off in response to the deactivated transfer control signal LTG3. While the transfer transistor LTX3 is off, i.e., during an exposure time, the photoelectric element PD4 may accumulate charge depending on incident light.

In some embodiments, the pixel PX3 may include a plurality of floating diffusions. Each of the plurality of floating diffusions may have predetermined capacitance, and be able to store charge generated by the photoelectric element PD4. Each of the plurality of floating diffusions may have parasitic capacitance. In some embodiments, the pixel PX3 may further include capacitors as passive elements coupled to the plurality of floating diffusions, respectively.

The reset transistor RX3 may be coupled between the first node N31 and a voltage line that supplies pixel power supply voltage VPIX, and be controlled by the reset control signal RG3. When the reset transistor RX3 is turned on by the reset control signal RG3, the pixel power supply voltage VPIX can be applied to the first node N31 such that the first node N31 is reset.

The gate of the drive transistor SF is coupled to the first node N31. The drive transistor SF may operate as a source-follower amplifier with respect to the voltage of the first node N31. The drive transistor SF may output the pixel voltage to a column line CL3 through the selection transistor SX3 in response to the voltage of the first node N31.

The selection transistor SX3 may be coupled between the drive transistor SF and the column line CL3, and be controlled by the selection signal SEL. When the selection transistor SX3 is turned on, the pixel voltage which is output from the drive transistor SF can be output to a readout circuit (reference symbol "260" in FIG. 2) through the column line CL3 coupled to the selection transistor SX3.

The state code measure module 1650 may be coupled to the pixel PX3. The state code measure module 1650 may transmit the reset control signal RG3 to the gate of the reset transistor RX3, and transmit the transfer control signal LTG3 to the gate of the transfer transistor LTX3. The row driver may also be coupled to the pixel PX3 to provide the power supply voltage VDD and the pixel power supply voltage VPIX.

Specifically, the state code measure module 1650 may include a reset signal generation module 1651, a transfer signal generation module 1653, a first reset signal regulator 1655, a second reset signal regulator 1656, a first transfer control regulator 1657, and a second transfer control regulator 1658. Each of the state code measure module 1650, the reset signal generation module 1651, the transfer signal generation module 1653, the first reset signal regulator 1655, the second reset signal regulator 1656, the first transfer control regulator 1657, and the second transfer control regulator 1658 may be physically implemented by analog and/or digital circuits including one or more of a logic gate, an integrated circuit, a microprocessor, a microcontroller, a memory circuit, a passive electronic component, an active electronic component, and the like.

The reset signal generation module 1651 may include a first reset signal transistor RGX31, a second reset signal transistor RGX32, and a third reset signal transistor RGX33. The first reset signal transistor RGX31 and the third reset signal transistor RGX33 may be formed of a first type of transistors. The second reset signal transistor RGX32 may be formed of a second type of transistor. For example, the first type of transistors may be P-type transistors, and the second type of transistor may be an N-type transistor. The drain of the first reset signal transistor RGX31, the drain of the second reset signal transistor RGX32, and the drain of the third reset signal transistor RGX33 may be coupled to a third node N33. The source of the first reset signal transistor RGX31 may be coupled to the output terminal of the first reset signal regulator 1655. The source of the second reset signal transistor RGX32 may be coupled to ground voltage. The source of the third reset signal transistor RGX33 may be coupled to the output terminal of the second reset signal regulator 1656.

The first reset signal regulator 1655 may include an operational amplifier 16551, a pass transistor VRDX31, and a first resistor R31.

To a first terminal of the operational amplifier 16551, reference voltage V_REF31 may be provided. The reference voltage V_REF31 may be generated based on the power supply voltage VDD. A second terminal of the operational amplifier 16551 may be coupled to an output node N_OUT31. The reference voltage V_REF31 may be determined by a voltage drop from the power supply voltage VDD which is caused by any resistor and any transistor In some embodiments, the pass transistor VRDX31 may be a first type of transistor. For example, the first type of transistor may be a P-type transistor.

The first resistor R31 may be coupled in series between the output node N_OUT31 of the first reset signal regulator 1655 and a ground node. In other words, the voltage of the output node N_OUT31 may be input as feedback voltage V_FB31 to the second terminal of the operational amplifier 16551.

The operational amplifier 16551 may amplify the difference between the reference voltage V_REF31 which is input to the first terminal and the feedback voltage V_FB31 which is input to the second terminal, and the output of the operational amplifier 16551 may be input to the gate of the pass transistor VRDX31 to drive the pass transistor VRDX31. The second terminal of the operational amplifier 16551 may be coupled to the output node N_OUT31 of the first reset signal regulator 1655, and the feedback voltage V_FB31 may be the output voltage VRG1 of the first reset signal regulator 1655.

The second reset signal regulator 1656 may include the same configuration as that of the first reset signal regulator 1655. The second reset signal regulator 1656 may output output voltage VRG2.

On the other hand, in FIG. 16, it is shown that first reset voltage VRG1 to be applied to the reset signal generation module 1651 is generated by the first reset signal regulator 1655 and second reset voltage VRG2 is generated by the second reset signal regulator 1656; however, the disclosure is not limited thereto, and the first reset voltage VRG1 and the second reset voltage VRG2 may be generated by one regulator. For example, when a regulator includes two resistors coupled in series, it can generate two different output voltages, using voltage drops which are caused by the resistors.

The transfer signal generation module 1653 may include a first transfer control transistor TGX31, a second transfer control transistor TGX32, and a third transfer control transistor TGX33. The first transfer control transistor TGX31 and the third transfer control transistor TGX33 may be formed of a first type of transistors. The second transfer control transistor TGX32 may be formed of a second type of transistor. For example, the first type of transistors may be P-type transistors, and the second type of transistor may be an N-type transistor. The drain of the first transfer control transistor TGX31, the drain of the second transfer control transistor TGX32, and the drain of the third transfer control transistor TGX33 may be coupled to the gate of the transfer transistor LTX3. The source of the first transfer control transistor TGX31 may be coupled to the output terminal of the first transfer control regulator 1657. The source of the second transfer control transistor TGX32 may be coupled to the ground voltage. The source of the third transfer control transistor TGX33 may be coupled to the output terminal of the second transfer control regulator 1658.

The first transfer control regulator 1657 may include an operational amplifier 16571, a pass transistor VDRGX31, and a first resistor R32.

To a first terminal of the operational amplifier 16571, reference voltage V_REF32 may be provided. The reference voltage V_REF32 may be generated based on the power supply voltage VDD. A second terminal of the operational amplifier 16571 may be coupled to an output node N_OUT32. The reference voltage V_REF32 may be determined by a voltage drop from the power supply voltage VDD which is caused by any resistor and any transistor. In some embodiments, the pass transistor VDRGX31 may be a first type of transistor. For example, the first type of transistor may be a P-type transistor.

The first resistor R32 may be coupled in series between the output node N_OUT32 of the first transfer control regulator 1657 and the ground node. In other words, the voltage of the output node N_OUT32 may be input as feedback voltage V_FB32 to the second terminal of the operational amplifier 16571.

The operational amplifier 16571 may amplify the difference between the reference voltage V_REF32 which is input to the first terminal and the feedback voltage V_FB32 which is input to the second terminal, and the output of the operational amplifier 16571 may be input to the gate of the pass transistor VDRGX31 to drive the pass transistor VDRGX31. The second terminal of the operational amplifier 16571 may be coupled to the output node N_OUT32 of the first transfer control regulator 1657, and the feedback voltage V_FB32 may be the output voltage VNTG1 of the first transfer control regulator 1657.

The second transfer control regulator 1658 may include the same configuration as that of the first transfer control regulator 1657. The second transfer control regulator 1658 may output output voltage VNTG2.

On the other hand, in FIG. 16, it is shown that first transfer voltage VNTG1 to be applied to the transfer signal generation module 1653 is generated by the first transfer control regulator 1657 and second transfer voltage VNTG2 is generated by the second transfer control regulator 1658; however, the disclosure is not limited thereto, and the first transfer voltage VNTG1 and the second transfer voltage VNTG2 may be generated by one regulator.

Figure 17:
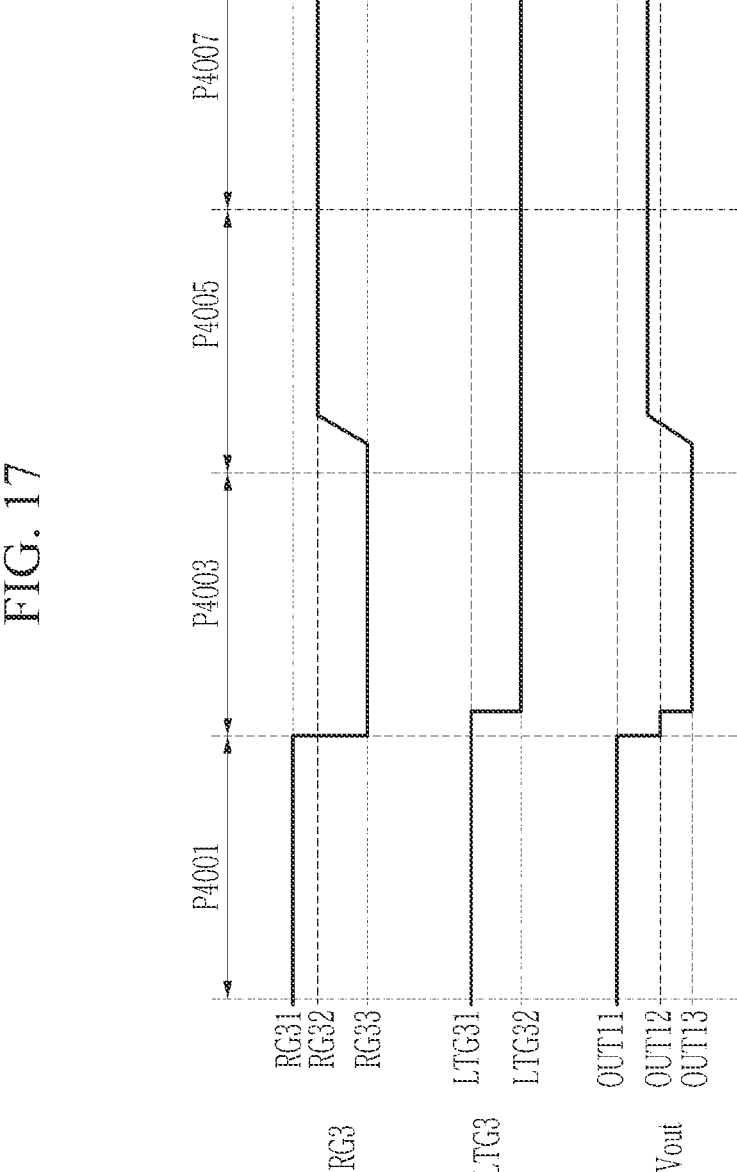
FIG. 17 is a timing chart illustrating the operation of the image sensor according to FIG. 16.
Figure 18:
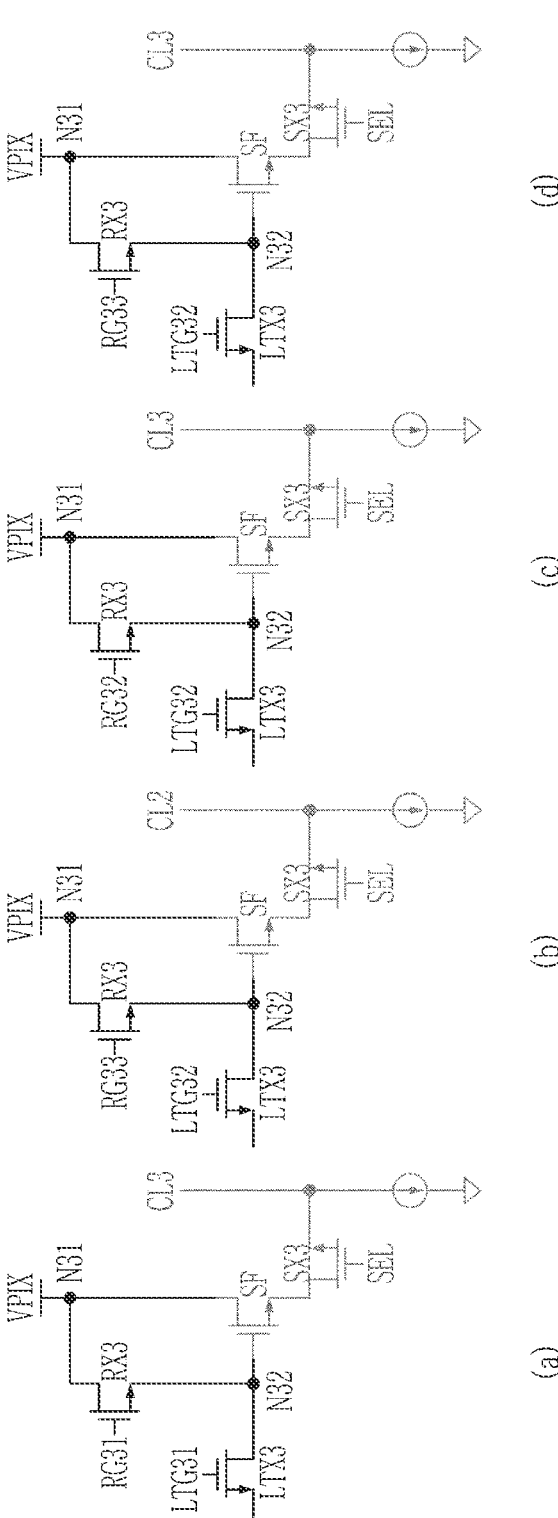
FIG. 18 is a view illustrating the circuit of the image sensor during the operation of the image sensor according to FIG. 17.

FIG. 17 is a timing chart illustrating the operation of the image sensor according to FIG. 16. FIG. 18 is a view illustrating the circuit of the image sensor during the operation of the image sensor according to FIG. 17.

The reset transistor RX3 may be turned on when the reset control signal RG3 has a first reset control level RG31 or a second reset control level RG32, and may be turned off when the reset control signal RG3 has a third reset control level RG33. Further, the transfer transistor LTX3 may be turned on when a transfer control signal LTX3 has a first transfer control level LTX31 or a second transfer control level LTX32.

Output voltage Vout may be a voltage at the first node N31 coupled to the gate of the drive transistor SF. The pixel voltage corresponding to the output voltage Vout may be transferred to the readout circuit (reference symbol "260" in FIG. 2) through the column line CL3.

First, in a first period P4001, the reset control signal RG3 may have the first reset control level RG31, and the transfer control signal LTX3 may have the first transfer control level LTX31.

Referring to FIG. 18 together, in the first period P4001, a first portion 1601 may have the structure shown in (a) of FIG. 18.

The reset transistor RX3 may be turned on by the first reset control level RG31, and the transfer transistor LTX3 may be turned on by the first transfer control level LTX31. Since the threshold voltage of the reset transistor RX3 is lower than the first reset control level RG31, the reset transistor RX3 can be fully turned on. Accordingly, the first node N31 may have the pixel power supply voltage VPIX. In other words, the first node N31 and a second node N32 may be reset by the reset voltage, whereby the charge stored in the first node N31 and the second node N32 may be removed.

In the first period P4001, the output voltage Vout may have a first voltage value OUT11. In this case, the first voltage value OUT11 may be based on the pixel power supply voltage VPIX.

A first pixel voltage based on the first voltage value OUT11 may be transferred to the readout circuit (reference symbol "260" in FIG. 2) through the column line CL3.

In a second period P4003, the reset control signal RG3 may have the third reset control level RG33, and the transfer control signal LTX3 may have the second transfer control level LTX32 after a predetermined time from when the reset control signal RG3 transfers to the third reset control level RG33.

Referring to FIG. 18, in the second period P4003, the first portion 1601 may have the structure shown in (b) of FIG. 18.

The reset transistor RX3 may be turned off by the third reset control level RG33. Since the reset transistor RX3 is on before the reset transistor RX3 is turned off, the first node N31 may have the pixel power supply voltage VPIX. Accordingly, when the reset transistor RX3 is turned off, due to the coupling phenomenon, the voltage of the first node N31 may decrease. In this case, the output voltage Vout may have a second voltage value OUT32.

Thereafter, the reset control signal RG3 and the transfer control signal LTX3 may be sequentially controlled such that the transfer control signal has the second transfer control level LTX32 after a predetermined time from when the reset control signal transitions to the third reset control level RG33. Since the transfer transistor LTX3 is turned off in the state where the reset transistor RX3 is off, the first node N31 can have a lower voltage by the coupling while less affected by the pixel power supply voltage VPIX. In this case the output voltage Vout may have a third voltage value OUT33.

A second pixel voltage based on the third voltage value OUT33 may be transferred to the readout circuit (reference symbol "260" in FIG. 2) through the column line CL3.

In a third period P4005, the reset control signal RG3 may increase from the third reset control level RG33 to the second reset control level RG32, and the transfer control signal LTX3 may have the second transfer control level LTX32.

Referring to FIG. 18, in the third period P4005, the first portion 1601 may have the structure shown in (c) of FIG. 18.

The reset transistor RX3 may be turned on by the second reset control level RG32, and the transfer transistor LTX3 may be turned off by the second transfer control level LTX32.

Since the reset transistor RX3 turned off by the third reset control level RG33 is turned on by the second reset control level RG32, the voltage to be applied to the first node N31 may increase. In this case, the reset transistor RX3 may be positioned in a triode region. On the other hand, when the voltage of the first node N31 which is the source side of the reset transistor RX3 is set to a low voltage, and the gate voltage of the reset transistor RX3 is raised to the second reset control level RG32, the voltage of the first node N31 which is the source side of the reset transistor RX3 may rise to the value which is obtained by subtracting the threshold voltage from the second reset control level RG32 which is the gate voltage of the reset transistor RX3.

Accordingly, the output voltage Vout may increase from the third voltage value OUT33 to the second voltage value OUT32. Since the reset transistor RX3 is positioned in the triode region, the second voltage value OUT32 may be based on the value which is obtained by subtracting the threshold voltage of the reset transistor RX3 from the second reset control level RG32.

A third pixel voltage based on the value which is obtained by subtracting the threshold voltage of the reset transistor RX3 from the second reset control level RG32 may be transferred to the readout circuit (reference symbol "260" in FIG. 2) through the column line CL3.

On the other hand, in the third period P4005, the readout circuit may sample and process the third pixel voltage corresponding to the second voltage value OUT32. However, since the reset transistor RX3 is on, when the image sensor operates under a high-temperature condition, the second voltage value OUT32 may be affected by the pixel power supply voltage VPIX.

In a fourth period P4007, the reset control signal RG3 may have the third reset control level RG33, and the transfer control signal LTX3 may have the second transfer control level LTX32.

Referring to FIG. 18, in the fourth period P4007, the first portion 1601 may have the structure shown in (d) of FIG. 18.

The reset transistor RX3 may be turned off by the third reset control level RG33, and the transfer transistor LTX3 may be turned off by the second transfer control level LTX32. By turning off the reset transistor RX3, the second voltage value OUT32 may be further less likely to be affected by the pixel power supply voltage VPIX. Accordingly, the readout circuit (reference symbol "260" in FIG. 2) may more accurately sample and process the third pixel voltage corresponding to the second voltage value OUT32.

The readout circuit (reference symbol "260" in FIG. 2) may sample the first pixel voltage in the first period P4001 to acquire a first code value corresponding to the first voltage value OUT31 based on the pixel power supply voltage VPIX, and may sample the third pixel voltage in the third period P4005 and the fourth period P4007 to acquire a second code value corresponding to the second voltage value OUT32 based on the value which is obtained by subtracting the threshold voltage of the reset transistor RX3 from the second reset control level RG32. The readout circuit (reference symbol "260" in FIG. 2) may transmit the acquired first code value and the acquired second code value to the image signal processor (reference symbol "290" in FIG. 2).

By subtracting the first code value from the acquired second code value, the image signal processor (reference symbol "290" in FIG. 2) may calculate a state code which is the code value related to the threshold voltage of the reset transistor RX3. By the way, the image signal processor (reference symbol "290" in FIG. 2) may calculate not only the state code but also a code related to the offset difference between the pixel power supply voltage VPIX and the second reset control level RG32.

Figure 19:
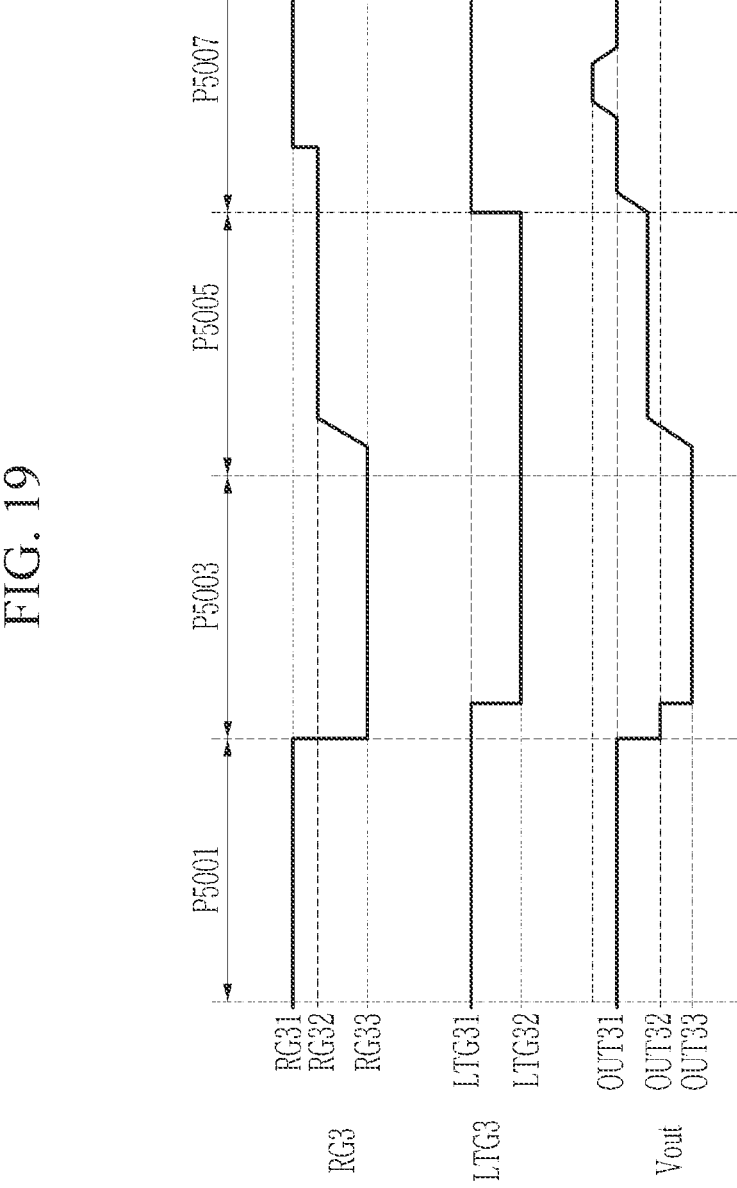
FIG. 19 is a timing chart illustrating the operation of the image sensor according to FIG. 16.
Figure 20:
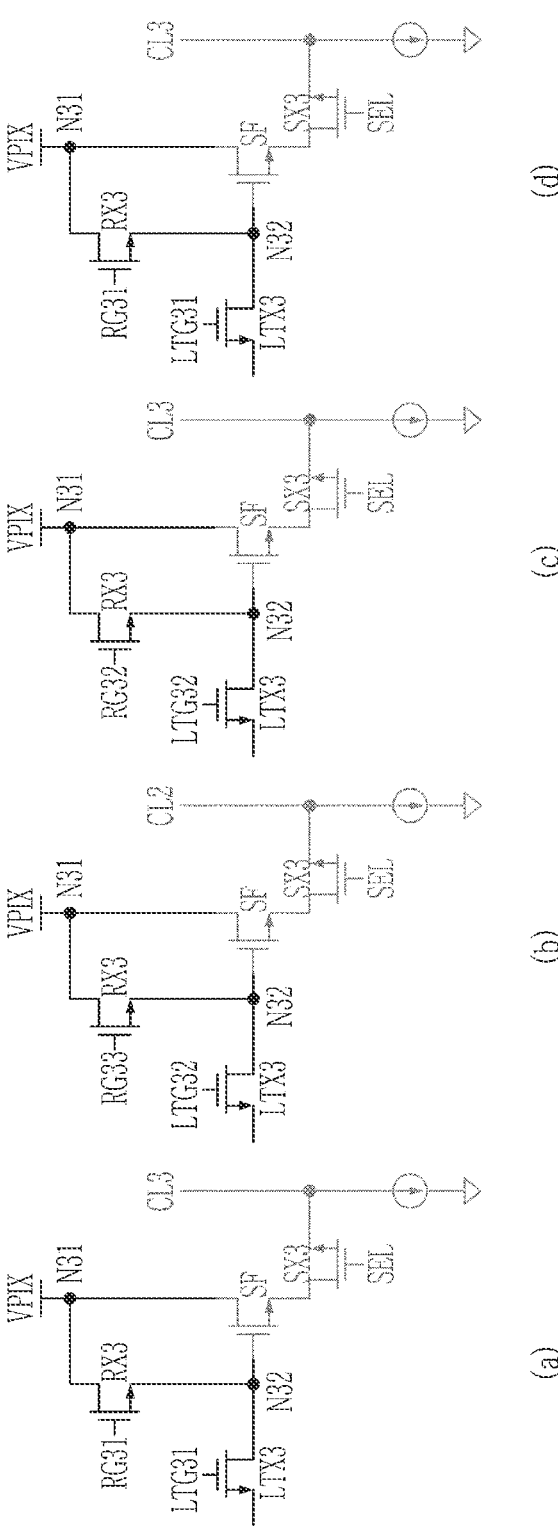
FIG. 20 is a view illustrating the circuit of the image sensor during the operation of the image sensor according to FIG. 19.

FIG. 19 is a timing chart illustrating the operation of the image sensor according to FIG. 16. FIG. 20 is a view illustrating the circuit of the image sensor during the operation of the image sensor according to FIG. 19.

The reset transistor RX3 may be turned on when the reset control signal RG3 has the first reset control level RG31 or the second reset control level RG32, and may be turned off when the reset control signal RG3 has the third reset control level RG33. Further, the transfer transistor LTX3 may be turned on when the transfer control signal LTX3 has the first transfer control level LTX31 or the second transfer control level LTX32.

The output voltage Vout may be the voltage at the first node N31 coupled to the gate of the drive transistor SF. The pixel voltage corresponding to the output voltage Vout may be transferred to the readout circuit (reference symbol "260" in FIG. 2) through the column line CL3.

In FIG. 19, the operations of the image sensor 1600 in a first period P5001, a second period P5003, and a third period P5005 may be similar to the operations of the image sensor 200 in a first period P4001, a second period P4003, and a third period P4005 shown in FIG. 17. Referring to FIG. 20 together, in the first period P5001, the first portion 1601 may have the structure shown in (a) of FIG. 20, and in the second period P5003, the first portion 1601 may have the structure shown in (b) of FIG. 20, and in the third period P5005, the first portion 1601 may have the structure shown in (c) of FIG. 20.

By the way, in a fourth period P5007, the transfer control signal LTX3 may have the first transfer control level LTX31, and the reset control signal RG3 may be changed from the second reset control level RG32 to the first reset control level RG31 after a predetermined time from when the transfer control signal LTX3 transitions to the first transfer control level LTX31.

Referring to FIG. 20, in the fourth period P5007, the first portion 1601 may have the structure shown in (d) of FIG. 20.

The reset transistor RX3 may be turned off by the third reset control level RG33, and the transfer transistor LTX3 may be turned off by the second transfer control level LTX32. By turning off the reset transistor RX3, the second voltage value OUT32 may be further less likely to be affected by the pixel power supply voltage VPIX. Accordingly, the readout circuit (reference symbol "260" in FIG. 2) may more accurately sample and process the third pixel voltage corresponding to the second voltage value OUT32.

The readout circuit (reference symbol "260" in FIG. 2) may sample the first pixel voltage in the first period P5001 to acquire a first code value corresponding to the first voltage value OUT31 based on the pixel power supply voltage VPIX, and may sample the third pixel voltage in the third period P5005 and the fourth period P5007 to acquire a second code value corresponding to the second voltage value OUT32 based on the value which is obtained by subtracting the threshold voltage of the reset transistor RX3 from the second reset control level RG32. The readout circuit (reference symbol "260" in FIG. 2) may transmit the acquired first code value and the acquired second code value to the image signal processor (reference symbol "290" in FIG. 2).

By subtracting the first code value from the acquired second code value, the image signal processor (reference symbol "290" in FIG. 2) may calculate a state code which is the code value related to the threshold voltage of the reset transistor RX3. By the way, the image signal processor (reference symbol "290" in FIG. 2) may calculate not only the state code but also a code related to the offset difference between the pixel power supply voltage VPIX and the second reset control level RG32.

Figure 21:
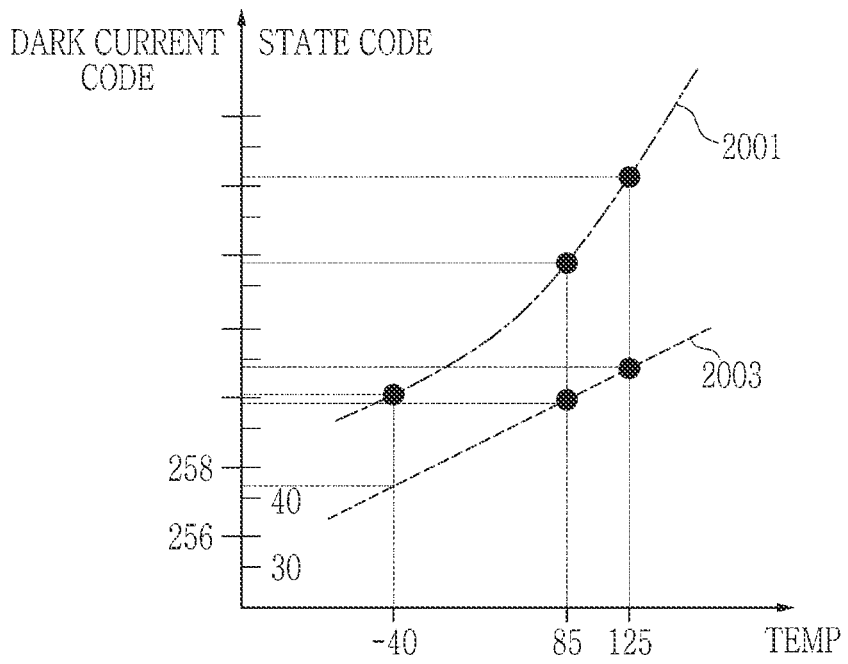
FIG. 21 is a view illustrating state codes and dark current codes depending on temperature values in the image sensor according to an embodiment.

FIG. 21 is a view illustrating state codes and dark current codes depending on temperature values in the image sensor according to an embodiment.

A first graph 2001 is a graph illustrating state codes according to temperature values TEMP acquired by the TMC 295.

In some embodiments, the state code measure module 250 may perform a preset state code measurement operation based on the type of a pixel PX coupled thereto. Thereafter, the image signal processor 290 may calculate state codes related to each pixel PX on the basis of a state signal received from the data buffer 280, and generate the first graph 2001 based on the temperature values TEMP received from the TMC 295.

A second graph 2003 is a graph illustrating dark current codes according to temperature values TEMP acquired by the TMC (reference symbol "295" in FIG. 2).

In some embodiments, the state code measure module 250 may perform a preset dark-current measurement operation based on the type of a pixel PX coupled thereto. Thereafter, the image signal processor 290 may receive dark current codes from the data buffer 280, and generate the second graph 2003 based on the temperature values TEMP received from the TMC 295.

Figure 22:
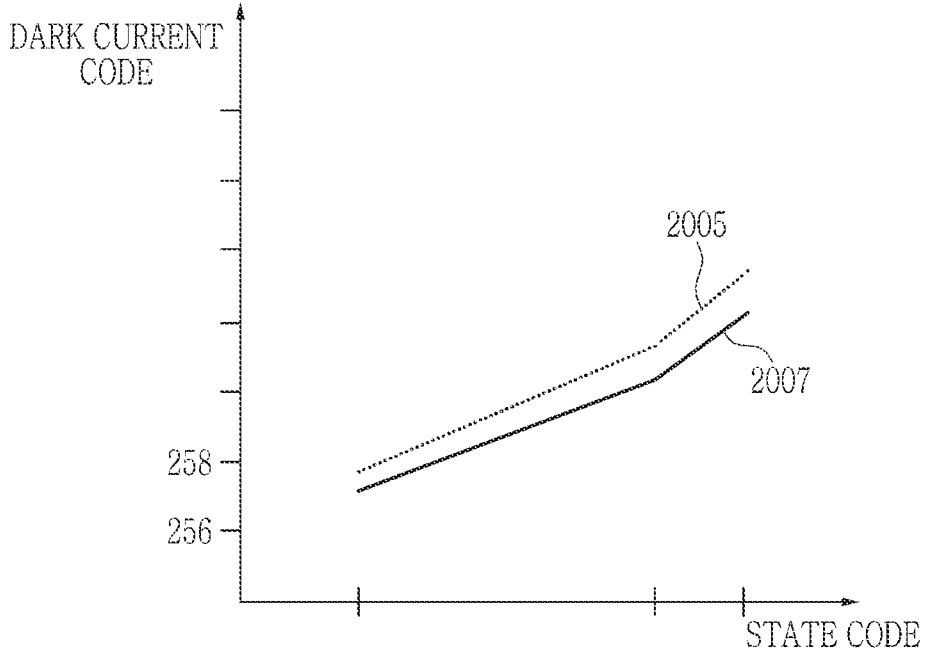
FIG. 22 is a view illustrating the dark current codes of a light-receiving region and a shaded region depending on state codes in the image sensor according to an embodiment.

FIG. 22 is a view illustrating the dark current codes of a light-receiving region and a shaded region depending on state codes in the image sensor according to an embodiment.

A first graph 2005 is a graph illustrating dark current codes according to the state codes of a pixel positioned in the shaded region 233.

A second graph 2007 is a graph illustrating dark current codes according to the state codes of a pixel positioned in the light-receiving region 231.

In some embodiments, the image signal processor 290 may acquire state codes according to temperature values TEMP and dark current codes according to the temperature values TEMP. On the basis of them, the image signal processor 290 may calculate the correlation between the state codes and dark current codes of the pixel PX.

Figure 23:
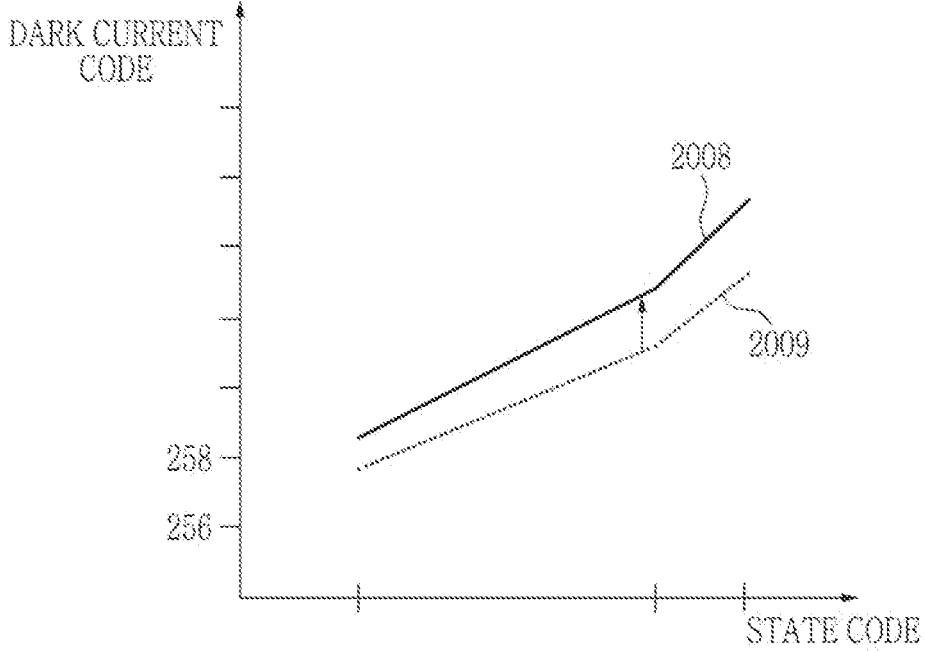
FIG. 23 is a view illustrating dark current codes of the shaded region depending on state codes in the image sensor according to an embodiment.

FIG. 23 is a view illustrating dark current codes of the shaded region depending on state codes in the image sensor according to an embodiment.

The first graph 2008 is a graph illustrating dark current codes according to the state codes of a pixel positioned in the shaded region 233.

Specifically, the first graph 2008 may be a graph illustrating the correlation between the state codes and the dark current codes acquired when the state code measure module 250 performed a state code measurement operation and a dark-current measurement operation on a pixel positioned in the shaded region 233 of the image sensor 200. In some embodiments, the first graph 2008 may be a graph illustrating the dark current codes of the shaded region according to the state codes in the image sensor 200 which was mounted in a module or whose characteristic varied over time.

A second graph 2009 is a graph illustrating dark current codes according to the state codes of a pixel positioned in the shaded region 233.

The second graph 2009 may be a graph illustrating the correlation between the state codes and the dark current codes acquired when the state code measure module 250 performed a state code measurement operation and a dark-current measurement operation on a pixel positioned in the shaded region 233 of the present image sensor 200. In some embodiments, the second graph 2009 may be a graph illustrating the dark current codes of the shaded region according to the state codes in the image sensor 200 in the EDS process step.

The image signal processor 290 may also calculate the correlation between the first graph 2008 illustrating the actual characteristic of the image sensor 200 and the second graph 2009 illustrating the ideal characteristic of the image sensor 200. For example, the first graph 2008 may be obtained by multiplying the second graph 2009 by an arbitrary shift factor.

Figure 24:
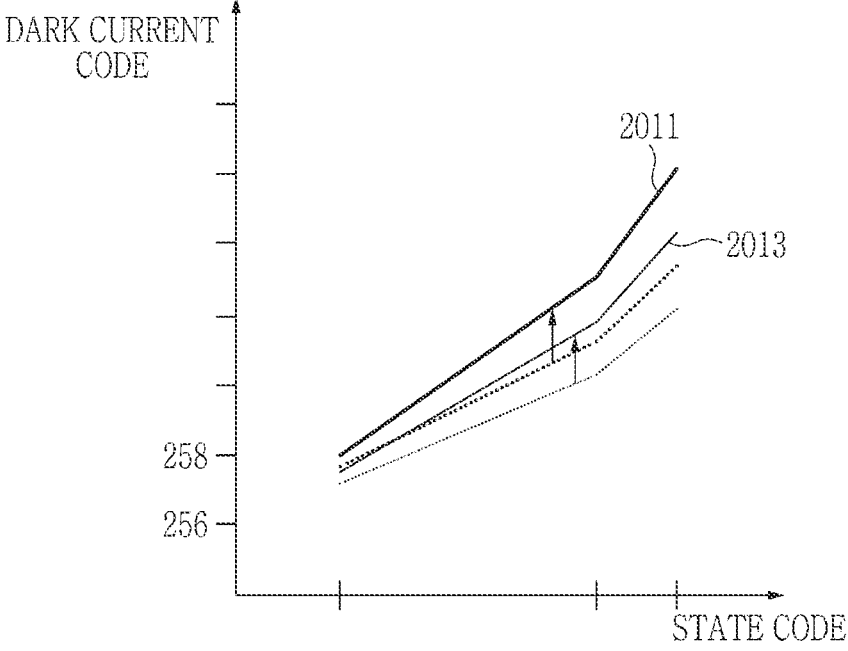
FIG. 24 is a view illustrating the dark current codes of the light-receiving region and the shaded region depending on state codes in the image sensor according to an embodiment.

FIG. 24 is a view illustrating the dark current codes of the light-receiving region and the shaded region depending on state codes in the image sensor according to an embodiment.

A first graph 2011 is a graph illustrating dark current codes according to the state codes of a pixel positioned in the shaded region 233.

In some embodiments, the first graph 2011 may be the first graph 2008 shown in FIG. 23.

A second graph 2013 is a graph illustrating dark current codes according to the state codes of a pixel positioned in the light-receiving region 231.

In some embodiments, the image signal processor 290 may acquire the second graph 2013 by multiplying the second graph 2007 shown in FIG. 22 by an arbitrary shift factor. Specifically, while the image sensor 200 is operating in the image sensing mode, it is difficult to acquire accurate dark current codes with respect to pixels positioned in the light-receiving region 231. For this reason, the image signal processor 290 may acquire a shift factor indicating the correlation between a graph illustrating the ideal characteristic of the image sensor 200 and the actual characteristic of the image sensor 200, using a pixel positioned in the shaded region 233. In this case, the shift factor may be a factor reflecting the aging or characteristic changing of the image sensor 200 over time.

Thereafter, the image signal processor 290 may acquire a graph reflecting the current characteristic of the image sensor 200 by applying the shift factor to the graph illustrating the ideal characteristic of the image sensor 200 (i.e., the second graph 2007 in FIG. 22) with respect to a pixel positioned in the light-receiving region 231.

Figure 25:
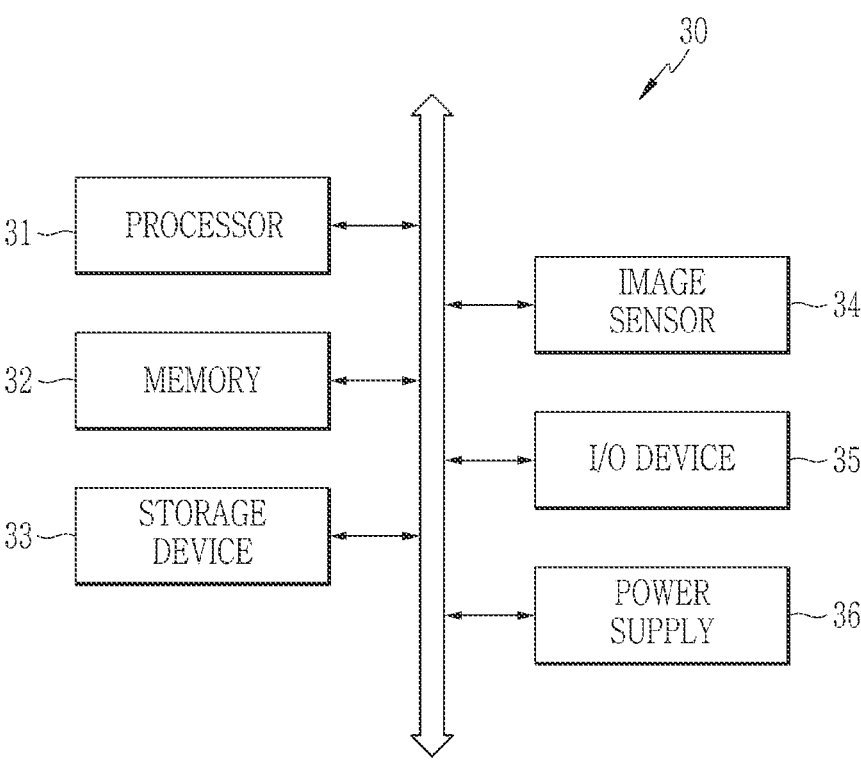
FIG. 25 is a block diagram illustrating an electronic device according to an embodiment.

FIG. 25 is a block diagram illustrating an electronic device according to an embodiment.

Referring to FIG. 25, an electronic device 30 may include a processor 31, a memory 32, a storage device 33, an image sensor 34, and an I/O device 35, and a power supply 36, and the individual components may perform communication with one another through a bus. Here, the image sensor 34 may be an image sensor described with reference to FIG. 1 to FIG. 20. The image sensor 34 may correct the dark shading or dark-current level difference between the light-receiving region and the shaded region in view of the temperature of a pixel in the image sensor 34, even after it is mounted in the electronic device 30. Further, the image sensor 34 may be able to correct a change in the elements in the pixel over time. Furthermore, the image sensor 34 may correct the dark shading and dark-current level difference in real time.

The processor 31 may perform specific calculations or tasks required for the operation of the electronic device 30. The memory 32 and the storage device 33 may store data required for the operation of the electronic device 30. For example, the processor 31 may include micro-processors, central processing units (CPUs), application processors (APs), etc., and the memory 32 may include volatile memories and/or non-volatile memories, and the storage device 33 may include solid state drives (SSDs), hard disk drives (HDDs), CD-ROMs, etc. The I/O device 35 may include input means such as a keyboard, a keypad, a mouse, and the like, and output means such as a printer and a display. The power supply 36 may supply operating voltage required for the operation of the electronic device 30.

FIG. 26 is a block diagram illustrating an electronic device according to an embodiment.

Referring to FIG. 26, an electronic device 40 according to an embodiment includes an image sensor 41, an image signal processor (ISP) 42, an application processor (AP) 43, a display device 44, a working memory 45, a storage device 46, a user interface 47, and a wireless transceiver 48. Here, the image sensor 41 and the image signal processor 42 may be an image sensor and an image signal processor described with reference to FIG. 1 to FIG. 20, respectively.

The image sensor 41 may generate image data, for example, raw image data, based on a received optical signal, and provide the image data to the image signal processor 42.

The image signal processor 42 may perform image processing for changing the data format of image data IDAT which is digital data on images, image processing for improving image quality such as noise removal, brightness adjustment, sharpness adjustment, etc., and so on.

In some embodiments, the image signal processor 42 may correct the dark-current level difference in the optical signal received from the image sensor 41, in real time.

In this disclosure, for ease of explanation, it has been described that the image signal processor 42 is provided separately from the application processor 43; however, the disclosure is not limited thereto. For example, the image signal processor 42 may not be configured with separate hardware or a composed of hardware and software, but may exist as a sub-component of the application processor 43.

The application processor 43 may control the overall operation of the electronic device 40, and may be provided in the form of a system-on-chip (SOC) for driving application programs, an operating system, etc. The application processor 43 may control the operation of the image signal processor 42, and may provide image data, generated and converted in the image signal processor 42, to the display device 44, or store the image data in the storage device 46.

The working memory 45 may store programs and/or data which are processed or executed by the application processor 43. The storage device 46 may be implemented with non-volatile memory devices such as NAND flash, resistive memories, etc., and for example, the storage device 46 may be provided in the form of a memory card (such as MMC, eMMC, SD, or micro SD), etc. The storage device 46 may store data and/or programs related to an execution algorithm for controlling the image processing operation of the image signal processor 42, and when the image processing operation is performed, the data and/or the programs may be loaded into the working memory 45. For example, the working memory 45 or the storage device 46 may include read-only memories (ROMs), flash memories, phase-change RAMs (PRAMs), magnetic RAMs (MRAMs), resistive RAMs (RRAMs), ferroelectric RAMs (FRAMs), etc., as non-volatile memories, and may include static RAMs (SRAMs) and dynamic RAMs (DRAMs) as volatile memories; however, they are not limited to the examples listed above.

The user interface 47 may be implemented with various devices capable of receiving user inputs, such as a keyboard, a curtain key panel, a touch panel, a fingerprint sensor, a microphone, etc. The user interface 47 may receive a user input, and provide a signal corresponding to the received user input, to the application processor 43. The wireless transceiver 48 may include a modem 48_1, a transceiver 48_2, and an antenna 48_3.

Figure 27:
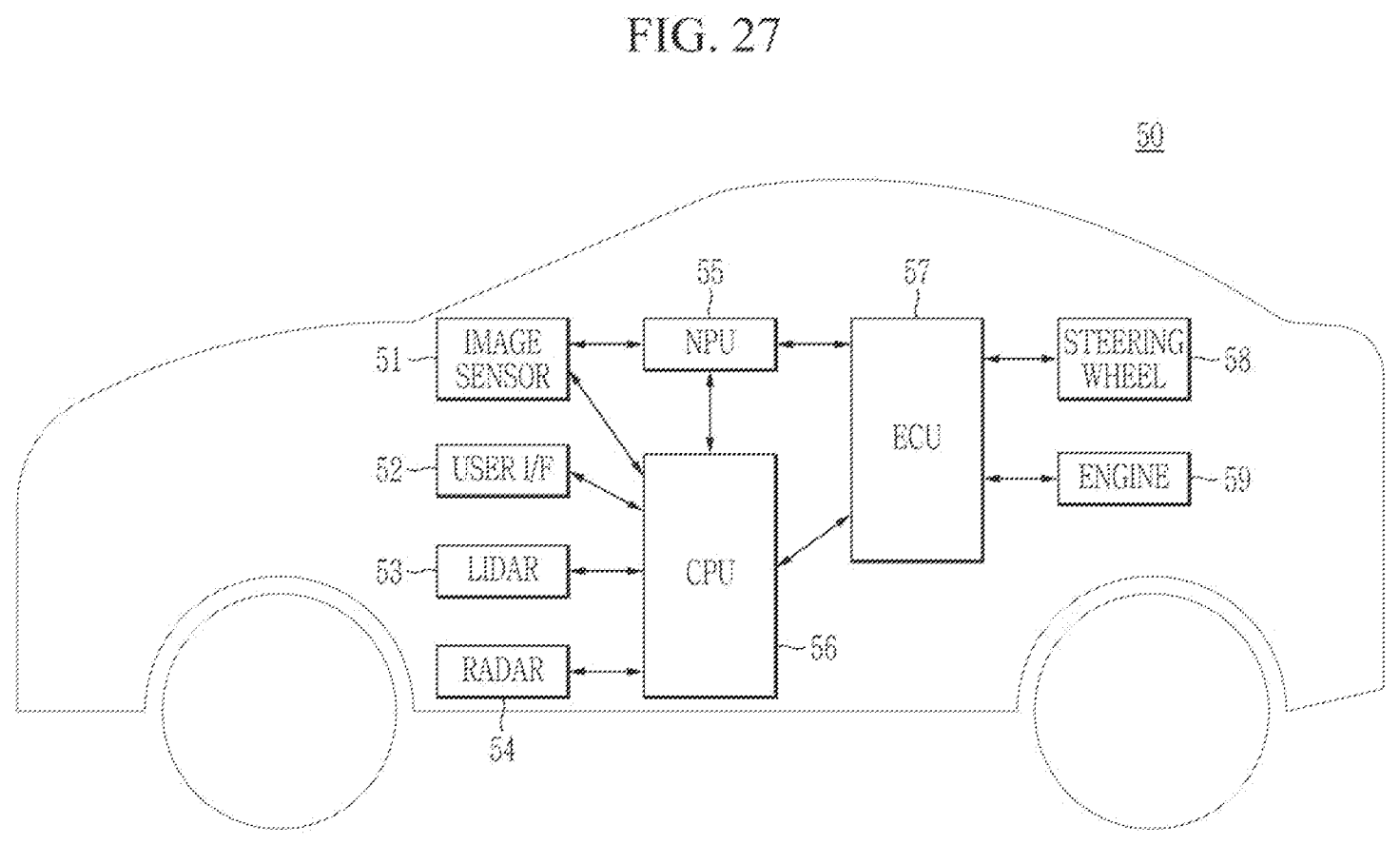

FIG. 27 is a block diagram illustrating a vehicle according to an embodiment.

As shown in FIG. 27, a vehicle 50 may include an image sensor 51, a user I/F 52, a LIDAR sensor (Light Detection and Ranging) 53, a RADAR (Radio Detection and Ranging) sensor 54, an NPU (Neural Processing Unit) 55, a CPU 56, and an ECU 57, and the ECU 57 may receive the steering angle of the vehicle and the speed of the vehicle from a steering wheel 58 and an engine 59. Besides, the vehicle 50 may further include a communication module, an input/output module, a security module, a power control device, and the like, and may also further include various types of control devices.

Here, the image sensor 51 may be an image sensor described with reference to FIG. 1 to FIG. 20.

In some embodiments, the vehicle 50 may detect objects, using information on the external environment acquired through the sensors (for example, the image sensor 51, the LIDAR sensor 53, and/or the RADAR sensor 54). The sensors 51, 53, and 54 may capture images of objects, measure the distances to the objects, and transmit them to the processors (for example, the CPU 56, the NPU 55, and the ECU 57). In order for the sensors 51, 53, and 54 to detect objects, besides the above-mentioned sensors, ToF (Time of Flight) sensors, ultrasonic sensors, infrared sensors, geomagnetic sensors, position sensors (e.g., GPS), acceleration sensors, atmospheric pressure sensors, temperature/humidity sensors, proximity sensors, gyroscope sensors, and so on may be further used.

The image sensor 51 may provide image or optical sensing, and may be, for example, a CMOS (complementary metal-oxide-semiconductor) image sensor. The image sensor 51 may acquire image or visual information on objects. For example, the image sensor 51 may be attached to the front of the vehicle to capture driving images or measure the distances to objects located in front of the vehicle, etc. The position at which the image sensor 51 is attached is not limited thereto, and the image sensor may be attached at various positions to accomplish the intended purpose of obtaining information on objects.

The image sensor 51 may capture images of the environment around the vehicle 50. The vehicle 50 may include at least two image sensors to capture images of the full 360-degree view of the vehicle's surroundings. In an embodiment, the image sensor 51 may include a wide-angle lens. In an embodiment, the vehicle 50 may include four image sensors for the front, rear, left, and right sides of the vehicle; however, the disclosure is not limited thereto, the single image sensor 51 may capture images of the environment around the vehicle. The image sensor 51 may continuously capture images of the vehicle's surroundings to continuously provide information on the vehicle's surroundings to the vehicle 50.

The images sensed by the image sensor 51 may be processed in the CPU 56 and/or the NPU 55. The CPU 56 may process the sensed images in a motion-based manner to detect objects, and the NPU 55 may process the sensed images in a shape-based manner to detect objects. The image sensor 51 may be attached to the front of the vehicle to sense the external environment in front of the vehicle; however, it is not limited thereto, and may be attached to various surfaces of the vehicle to sense the external environment.

Here, the image sensor 51 may be an image sensor described with reference to FIG. 1 to FIG. 20. The image sensor 51 may correct the dark shading or dark-current level difference between the light-receiving region and the shaded region in view of the temperature of a pixel in the image sensor 51, even after it is mounted in the vehicle 50. Further, the image sensor 51 may be able to correct a change in the elements in the pixel over time. Furthermore, the image sensor 51 may correct the dark shading and dark-current level difference in real time.

The user I/F 52 may include various electronic devices and mechanical devices included in the driver's seat, the passenger's seats, and so on, such as the vehicle's instrument panel, a display indicating driving information, a navigation device, an air conditioning system, etc.

The LIDAR sensor 53 may measure the distances to target objects by emitting a laser pulse and receiving the echoes of the laser pulse from the objects. The LIDAR sensor 53 may typically include a laser, a scanner, a receiver, and a positioning system. For the laser, light in the wavelength range of 600 nm to 1000 nm is generally used, but the wavelength range may differ depending on the laser's use. The scanner may scan the sensed surrounding environment to quickly acquire information on the surrounding environment, and there may be several forms of scanners using a plurality of mirrors. The receiver may receive the laser pulses reflected from target objects, and sense and amplify photons from the laser pulses. The positioning system may check out the location coordinates and direction of the device equipped with the receiver, to realize three-dimensional images. The LIDAR sensor 53 and the RADAR sensor 54 may be differentiated according to their effective measurement distances.

The RADAR sensor 54 may emit an electromagnetic wave and receive the echoes of the electromagnetic wave from target objects, to measure the distances to the objects or identify the objects, or measure the locations and moving speeds of the objects, etc. The RADAR sensor 54 may include a transmitter and a receiver. The transmitter may generate and output an electromagnetic wave, and the receiver may receive the echoes from target objects and process the signals. The RADAR sensor 54 may perform transmission and reception through one antenna, but is not limited thereto. The electromagnetic wave frequency band which is used in the RADAR sensor 54 may be a radio wave band or a micro wave band, but may be changed depending on its purpose. In an embodiment, the LIDAR sensor 53 and the RADAR sensor 54 may be attached to the vehicle to assist in determining the relative positional relationship between the vehicle and objects of interest. The RADAR sensor 54 may be categorized as a long radar sensor or a short radar sensor.

The NPU 55 may receive input data, and perform computations using an artificial neural network, and provide output data based on the computation results. The NPU 55 may be a processor optimized for simultaneous matrix operations, and be able to process multiple computations in real time, and derive optimal values by self-learning based on accumulated data. The NPU 55 may be optimized for simultaneous matrix operations to be able to process multiple computations in real time and derive the local-maximum at the current driving parameters by self-learning based on accumulated data.

In an embodiment, the NPU 55 may be a specialized processor to execute a deep-learning type algorithm. For example, the NPU 55 is capable of arithmetic processing based on various types of networks such as a CNN (Convolution Neural Network), an R-CNN (Region with Convolution Neural Network), an RPN (Region Proposal Network), an RNN (Recurrent Neural Network), a fully convolutional network, an LSTM (Long Short-Term Memory) network, a classification network, etc. However, the NPU is not limited thereto, and may be capable of various kinds of arithmetic processing simulating human neutral networks.

The NPU 55 may receive driving images from the image sensor 51, and perform shape-based object detection based on the driving images. The NPU 55 may identify each of a plurality of objects in the driving images by extracting the features of the plurality of objects and performing self-learning based on the accumulated data. For example, the NPU 55 may extract objects serving as criteria for driving, such as vehicles, pedestrians, traffic lights, lanes, etc., even from a single driving image, on the basis of the features determined using the accumulated data as learning materials.

The CPU 56 controls the overall operation of the vehicle 50. The CPU 56 may include a single processor core, or may include multiple processor cores. The CPU 56 may process or execute programs and/or data stored in the memories. For example, the CPU 56 may control the functions of the NPU 55 and the ECU 57 by executing programs stored in the memories.

The CPU 56 may acquire the steering angle and the vehicle speed from the ECU 57. The steering angle may be determined by the driver's operation on the steering wheel 58, and be processed by the ECU 57 controlling the operation of a steering control unit, and be provided to the CPU 56. The vehicle speed may be measured based on at least one of the driver's pedaling (e.g., the operation on the accelerator), the rotational speed of the engine 59, and the wheel speed measured by wheel sensors, and may be processed in the ECU 57 controlling the vehicle speed and be provided to the CPU 56.

Further, the CPU 56 may determine the relative position relationship between the vehicle and the surrounding vehicles, and may issue a command to maintain the number of revolutions of the engine 59 for cruising to maintain a certain distance from a surrounding vehicle according to a predetermined driving plan, and may issue a command to adjust the steering wheel 58 to the left or right to change the steering angle, to perform an evasive maneuver when the vehicle and the surrounding vehicle are below a threshold distance, or when the surrounding vehicle cuts in. In FIG. 27, the steering wheel 58 and the engine 59 are shown as components related to the steering angle and the vehicle speed; however, the disclosure is not limited thereto, and the steering angle and the vehicle speed may be determined through various vehicle components.

The CPU 56 may perform object detection on driving images in a motion-based manner. The motion-based manner is a method of detecting the degree of motion of an object over time to determine its relative motion. Driving images may be consecutively acquired in units of a frame through the image sensor 51. For example, individual frames may be acquired at a rate of 60 fps (frames per second). In this case, the CPU 56 may detect motions over time between image frames acquired every 1/60 seconds. In the motion-based manner, optical flow which refers to the distribution of motion vectors of an object, and so on may be included.

The CPU 56 may auxiliarily use the distances to objects acquired from the LIDAR sensor 53 and the RADAR sensor 54 other than the image sensor 51, to maintain a stable driving state of the vehicle. Further, the CPU 56 may issue commands to adjust the conditions inside and outside the vehicle, in response to driver's operations on the user I/F 52.

The ECU 57 may be an electronic control unit provided to control the overall operation or a part of the operation of the vehicle. The ECU 57 may control the operation of the vehicle according to parameters of the vehicle based on the operation of a combustion engine, the operation of one or more electric motors, a semi-automatic gearbox (SAGB) or an automatic gearbox (AGB), and other driver's control, through a CAN (controller area network) multiplexing bus.

The ECU 57 may electronically control the vehicle's engine, the actuator of the steering control device, the shift control system, the anti-lock brake system, the airbag control system, and the like, by a computer, and may provide the vehicle speed based on the rotational speed of the engine or the wheel speed measured by a wheel sensor, to the vehicle 50, and may provide the steering angle of the vehicle from the steering control device to the vehicle 50.

In an embodiment, the ECU 57 may control the states of the steering wheel 58 and the engine 59 in response to commands issued by the CPU 56 and the NPU 55. In an embodiment, the ECU 57 may accelerate or decelerate the vehicle in response to commands issued by the CPU 56 and NPU 55, and may provide a signal to the engine 59 to increase or decrease the rotational speed of the engine for acceleration or deceleration. Further, the ECU 57 may adjust the steering wheel 58 to the left or right for an evasive maneuver according to a predetermined driving plan, when the distance to a surrounding vehicle is below a threshold distance, or when a surrounding vehicle cuts in.

According to an embodiment of this disclosure, the CPU 56 or the ECU 57 may check defects in a ramp signal RML to turn off the autonomous driving mode of the vehicle 50. For example, the CPU 56 or the ECU 57 may detect a defect in the ramp signal RML while the vehicle is running in the autonomous driving mode based on the image sensor 51, and immediately change the driving mode from the autonomous driving mode to the manual driving mode by the driver, such that the safety of the user is secured. For example, the vehicle 50 may detect a defect in the ramp signal RML, and stop the driving assistance function based on the ramp signal RML, such that the safety of the driver or the user is secured.

In the drawing, it is shown that the ECU 57 is provided separately from the CPU 56 in the vehicle; however, the disclosure is not limited thereto, and the vehicle control function of the ECU 57 may be given to the CPU 56 and be performed in the CPU, and in this case, the CPU 56 may be understood as having at least two processor cores. In FIG. 27, it is shown that the ECU 57 is a separate component from the CPU 56; however, it is not limited thereto, and may be included in the CPU 56.

The vehicle 50 may further include a communication module. The communication module may transmit and receive data to and from the outside of the vehicle 50. For example, the communication module may perform communication with objects outside the vehicle 50. In this case, the communication module may perform communication in the V2X (Vehicle to Everything) manner. For example, the communication module may perform communication in the V2V (Vehicle to Vehicle) manner, the V2I (Vehicle to Infra) manner, the V2P (Vehicle to Pedestrian) manner, and the V2N (Vehicle to Nomadic Devices) manner. However, the communication module is not limited thereto, may transmit and receive data in various well-known communication manners. For example, the communication module may perform communication by, for example, 3G, 4G (LTE), 5G, Wi-Fi, BLE (Bluetooth Low Energy), Zigbee, NFC (Near Field Communication), and ultrasonic communication methods, etc., and may perform both short-range and long-range communication.

While certain example embodiments the disclosure have been particularly shown and described, it will be understood that various changes in form and details may be made therein without departing from the spirit and scope of the following claims.

What is claimed is:
1. An image sensor comprising:
a pixel array comprising a plurality of first pixels configured to receive light and output a plurality of first pixel signals;
a row driver coupled to the plurality of first pixels and configured to apply a preset voltage to the plurality of first pixels; and
an image signal processor configured to:

obtain first state codes, each related to one of the plurality of first pixels comprising at least one first temperature monitoring pixel, based on a plurality of second pixel signals received from the plurality of first pixels based on the preset voltage being applied to the plurality of first pixels; and process the plurality of first pixel signals based on the first state codes.

2. The image sensor of claim 1, wherein the image signal processor is configured to:

measure first dark current codes for the plurality of first pixels based on the plurality of second pixel signals; and generate a first compensation table based on a first temperature state code related to the at least one first temperature monitoring pixel and the first dark current codes corresponding to the first temperature state code, the first compensation table comprising first information about at least one of the first temperature state code, and the first dark current codes.

3. The image sensor of claim 2, wherein the image sensor is configured to generate first image data based on the plurality of first pixel signals, while operating in an image sensing mode, and wherein the image signal processor is configured to:

determine the first dark current codes corresponding to the first state codes based on the first compensation table; and compensate the first image data based on the first dark current codes.

4. The image sensor of claim 3, wherein the image signal processor is configured to compensate the first image data during a vertical blank period based on the pixel array not outputting the plurality of first pixel signals.

5. The image sensor of claim 2, wherein the pixel array further comprises a plurality of second pixels positioned in a region shielded from the light, wherein the plurality of second pixels comprise at least one second temperature monitoring pixel, wherein the image signal processor is configured to:

obtain second state codes, each related to one of the plurality of second pixels, based on third pixel signals received from the plurality of second pixels based on the preset voltage being applied to the plurality of second pixels, measure second dark current codes related to the plurality of second pixels based on the third pixel signals, and generate a second compensation table containing second information on second state codes and the second dark current codes corresponding to the second state codes, based on at least one of the second state codes of the at least one second temperature monitoring pixel, and the second dark current codes of the at least one second temperature monitoring pixel.

6. The image sensor of claim 5, wherein the image sensor is configured to generate first image data based on the plurality of first pixel signals, while operating in an image sensing mode, and wherein the image signal processor is configured to:

update the first dark current codes in the first compensation table with the second dark current codes based on there being a difference between the second dark current codes and the first dark current codes in the second compensation table.

7. The image sensor of claim 6, wherein the image signal processor is configured to update the second compensation table during a vertical blank period based on the pixel array not outputting the plurality of first pixel signals.

8. The image sensor of claim 2, further comprising:

a temperature monitoring circuit positioned below the pixel array, and configured to measure a temperature value of the at least one first temperature monitoring pixel, and transmit the temperature value to the image signal processor.

9. The image sensor of claim 2, wherein the plurality of first pixels are divided into a plurality of pixel groups, and each of the plurality of pixel groups comprises at least one first pixel, wherein the image signal processor is configured to measure third dark current codes related to representative pixels each of the plurality of pixel groups, based on the plurality of second pixel signals received from the representative pixels, and generate a third compensation table containing third information on third state codes and the third dark current codes corresponding to the third state codes, based on at least one of temperature values of the representative pixels, the third state codes of the representative pixels, and the third dark current codes, and wherein the image sensor is configured to:

generate second image data based on the plurality of first pixel signals, while operating in an image sensing mode, obtain the third state codes related to the at least one first pixel of each of the plurality of pixel groups, and determine the third dark current codes related to each of the plurality of first pixels, based on the third compensation table, and compensates the second image data based on the third dark current codes.

10. The image sensor of claim 1, wherein the plurality of first pixels comprise reset transistors coupled between first nodes and voltage lines and configured to supply a reset voltage and are controlled by a reset control signal, gain control transistors coupled between the first nodes and second nodes and configured to be controlled by gain control signals, and drive transistors configured to transfer pixel voltages corresponding to voltages of the second nodes, as the plurality of second pixel signals, to the image signal processor, and wherein the row driver comprises a reset voltage generation module configured to generate the reset voltage, and a gain control signal generation module configured to generate the gain control signals.

11. The image sensor of claim 10, wherein, based on the reset voltage being a first voltage, the reset control signal having a first reset control level, and the gain control signals having a first gain control level, the second nodes have a first voltage value, wherein, based on the reset voltage being a second voltage lower than the first voltage, the reset control signal having the first reset control level, and the gain control signals having a second gain control level lower than the first gain control level, the second nodes have a second voltage value, wherein, based on the reset voltage being a third voltage higher than the first voltage, the reset control signal having the first reset control level, the gain control signals having the second gain control level, the second nodes have a third voltage value, and wherein, the image signal processor is configured to obtain the first state codes based on a first pixel voltage corresponding to the first voltage value, and a third pixel voltage corresponding to the third voltage value.

12. The image sensor of claim 11, wherein based on the reset voltage being the third voltage higher than the first voltage, the reset control signal having a second reset control level lower than the first reset control level, and the gain control signals having the second gain control level, the second nodes have a fourth voltage value, and wherein the image signal processor is configured to obtain the first state codes based on the first pixel voltage corresponding to the first voltage value, and a fourth pixel voltage corresponding to the fourth voltage value.

13. The image sensor of claim 10, wherein, based on the reset voltage being a first voltage, the reset control signal having a first reset control level, and the gain control signals having a first gain control level, the second nodes have a first voltage value, wherein, based on the reset voltage being a second voltage higher than the first voltage, the reset control signal having the first reset control level, and the gain control signals having the first gain control level, the second nodes have a second voltage value, wherein, based on the reset voltage being the second voltage, the reset control signal having a second reset control level lower than the first reset control level, and the gain control signals having the first gain control level, the second nodes have a third voltage value, wherein, based on the reset voltage being the first voltage, the reset control signal having the first reset control level, and the gain control signals having the first gain control level, the second nodes have a fourth voltage value, and wherein the image signal processor is configured to obtain the first state codes based on a third pixel voltage corresponding to the third voltage value, and a fourth pixel voltage corresponding to the fourth voltage value.

14. The image sensor of claim 13, wherein, based on the reset voltage being the first voltage, and the reset control signal having the second reset control level, and the gain control signals having the first gain control level, the second nodes have a fifth voltage value, and wherein the image signal processor is configured to obtain the first state codes based on the third pixel voltage corresponding to the third voltage value, and a fifth pixel voltage corresponding to the fifth voltage value.

15. The image sensor of claim 1, wherein the plurality of first pixels comprise reset transistors coupled between pixel power supply voltage lines and first nodes and configured to be controlled by a reset control signal, gain control transistors coupled between the first nodes and second nodes and configured to be controlled by gain control signals, and drive transistors configured to transfer pixel voltages corresponding to voltages of the second nodes, as the plurality of second pixel signals, to the image signal processor, and wherein the row driver comprises a gain control signal generation module configured to generate the gain control signals.

16. The image sensor of claim 15, wherein, based on the reset control signal having a first reset control level, and the gain control signals having a first gain control level, the second nodes have a first voltage value, wherein, based on the reset control signal having a second reset control level lower than the first reset control level, and the gain control signals having a second gain control level lower than the first gain control level, the second nodes have a second voltage value, wherein, based on the reset control signal having the first reset control level, and the gain control signals having a third gain control level lower than the first gain control level and higher than the second gain control level, the second nodes have a third voltage value, and wherein the image signal processor is configured to obtain the first state codes based on a first pixel voltage corresponding to the first voltage value, and a third pixel voltage corresponding to the third voltage value.

17. The image sensor of claim 1, wherein the plurality of first pixels comprise reset transistors coupled between pixel power supply voltage lines and first nodes and configured to be controlled by a reset control signal, transfer transistors coupled between the first nodes and photoelectric elements and configured to be controlled by transfer signals, and drive transistors configured to transfer pixel voltages corresponding to voltages of the first nodes, as the plurality of second pixel signals, to the image signal processor, and wherein the row driver comprises a reset signal generation module configured to generate the reset control signal, and a transfer signal generation module configured to generate the transfer signals.

18. The image sensor of claim 17, wherein, based on the reset control signal having a first reset control level, and the transfer signals having a first transfer control level, the first nodes have a first voltage value, wherein, based on the reset control signal having a second reset control level lower than the first reset control level, and the transfer signals having a second transfer control level lower than the first transfer control level, the first nodes have a second voltage value, wherein, based on the reset control signal having a third reset control level lower than the first reset control level and higher than the second reset control level, and the transfer signals having the second transfer control level, the first nodes have a third voltage value, and wherein the image signal processor is configured to obtain the first state codes based on a first pixel voltage corresponding to the first voltage value, and a third pixel voltage corresponding to the third voltage value.

19. An operating method of an image sensor, comprising:

performing a first state code measurement operation by receiving light and applying a preset voltage to a plurality of first pixels to output a plurality of first pixel signals;

performing a first state code obtaining operation by obtaining first state codes, each related to one of the plurality of first pixels comprising at least one first temperature monitoring pixel, based on a plurality of second pixel signals received from the plurality of first pixels based on the preset voltage being applied to the plurality of first pixels;

performing a dark-current code measurement operation on the plurality of first pixels based on the plurality of second pixel signals; and generating a first compensation table containing first information on the first state codes and first dark current codes corresponding to the first state codes, based on the first state codes and the first dark current codes.

20. The operating method of the image sensor of claim 19, further comprising:

performing the first state code obtaining operation while generating first image data based on the plurality of first pixel signals, and determining the first dark current codes based on the first compensation table, and compensating the first image data based on the first dark current codes.

* * * * *